US012631508B2

(12) United States Patent
Haubold et al.

(10) Patent No.: US 12,631,508 B2
(45) Date of Patent: May 19, 2026

(54) PRESSURE SENSING DEVICE

(71) Applicant: Infineon Technologies Dresden GmbH & Co. KG, Dresden (DE)

(72) Inventors: Marco Haubold, Dresden (DE); Mirko Vogt, Dresden (DE); Maik Stegemann, Freital / Pesterwitz (DE); Marco Müller, Pirna (DE); Anita Förster, Dresden (DE); Anne Boitier-Mahlberg, Dresden (DE)

(73) Assignee: Infineon Technologies Dresden GmbH & Co. KG, Dresden (DE)

( * ) Notice: Subject to any disclaimer, the term of this patent is extended or adjusted under 35 U.S.C. 154(b) by 452 days.

(21) Appl. No.: 18/298,831

(22) Filed: Apr. 11, 2023

(65) Prior Publication Data

US 2023/0332969 A1 Oct. 19, 2023

(30) Foreign Application Priority Data

Apr. 14, 2022 (EP) ..................................... 22168421

(51) Int. Cl.
G01L 9/00 (2006.01)
G01L 7/08 (2006.01)
G01L 13/02 (2006.01)
G01L 19/06 (2006.01)

(52) U.S. Cl.
CPC .......... G01L 9/0072 (2013.01); G01L 13/025 (2013.01); G01L 19/0618 (2013.01)

(58) Field of Classification Search
CPC ............................ G01L 19/0618; G01L 9/008
See application file for complete search history.

(56) References Cited

U.S. PATENT DOCUMENTS

| 9,136,165 | B2 * | 9/2015 | Zhang ................. B81C 1/00984 |
| 2017/0089786 | A1 | 3/2017 | Willcox et al. |
| 2020/0112799 | A1 | 4/2020 | Kuntzman et al. |
| 2024/0288324 | A1 * | 8/2024 | Kreutzer ............... G01L 9/0072 |

FOREIGN PATENT DOCUMENTS

| JP | H08271364 A | 10/1996 |
| WO | 9405986 A1 | 3/1994 |
| WO | 2016203106 A1 | 12/2016 |
| WO | 2019199520 A1 | 10/2019 |

* cited by examiner

*Primary Examiner* — Herbert K Roberts
(74) *Attorney, Agent, or Firm* — Slater Matsil, LLP

(57) ABSTRACT

A pressure sensing device includes a deflectable membrane structure to provide a deflection dependent output signal based on a pressure load, and a mechanical abutment structure for adjusting a spring constant of the deflectable membrane structure depending on the deflection of the deflectable membrane structure, wherein the mechanical abutment structure provides an abutting condition of the deflectable membrane structure when the deflection of the deflectable membrane structure exceeds a deflection threshold, wherein the abutting condition results in a change from a first spring constant to an increased, second spring constant of the deflectable membrane structure.

20 Claims, 11 Drawing Sheets

1

1
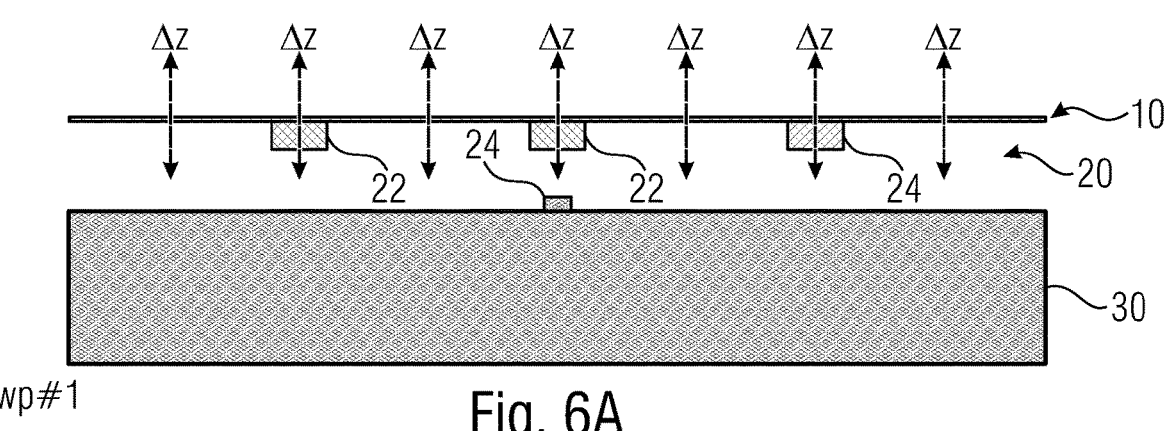
wp#1
Fig. 6A
1
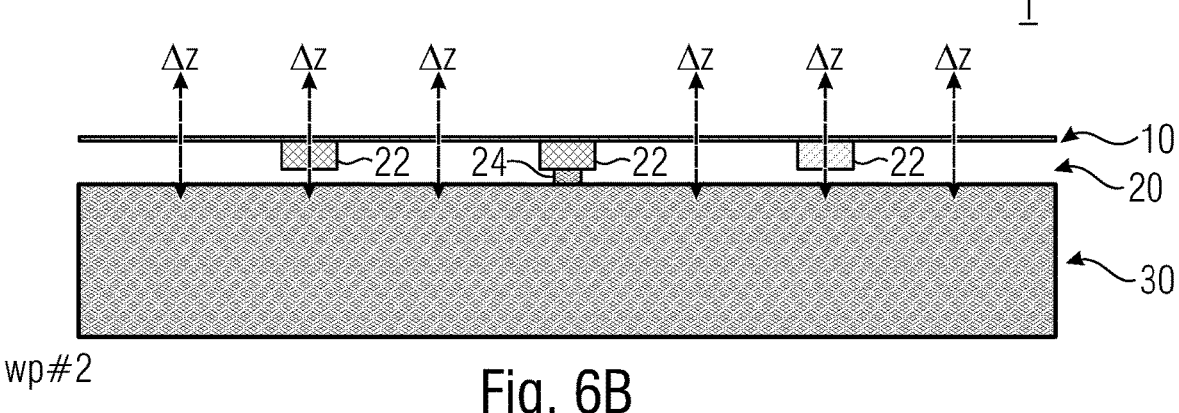
wp#2
Fig. 6B
1
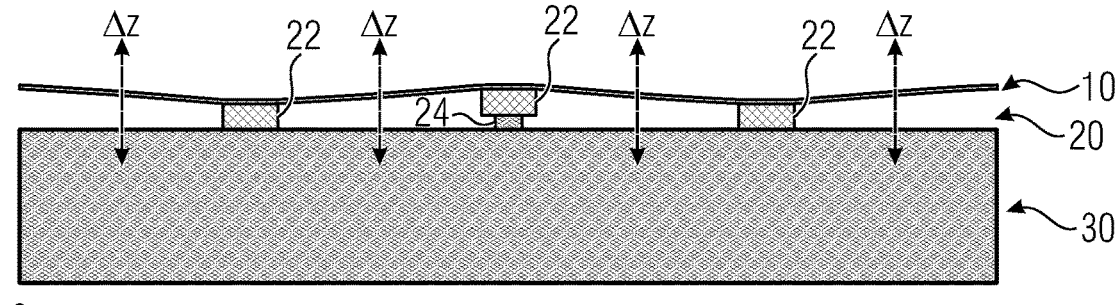
wp#3
Fig. 6C
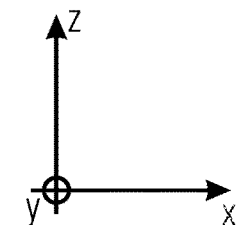

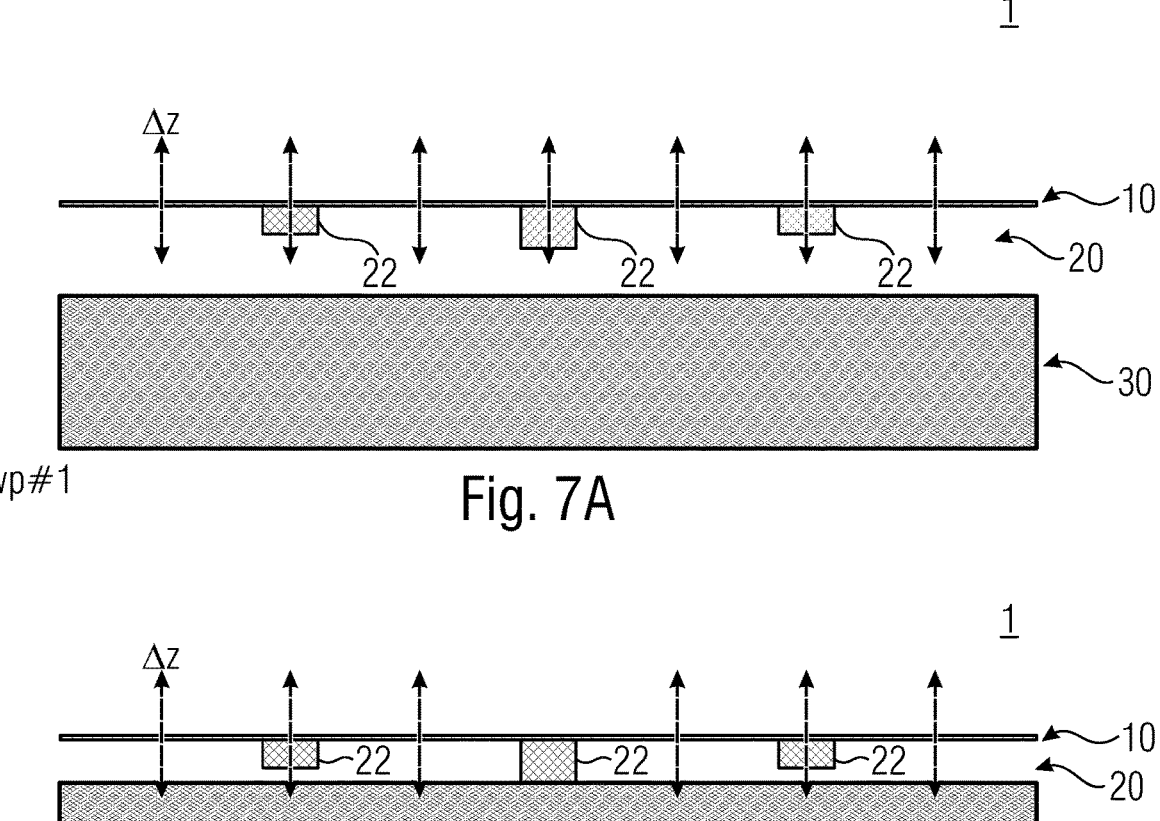
wp#1
Fig. 7A
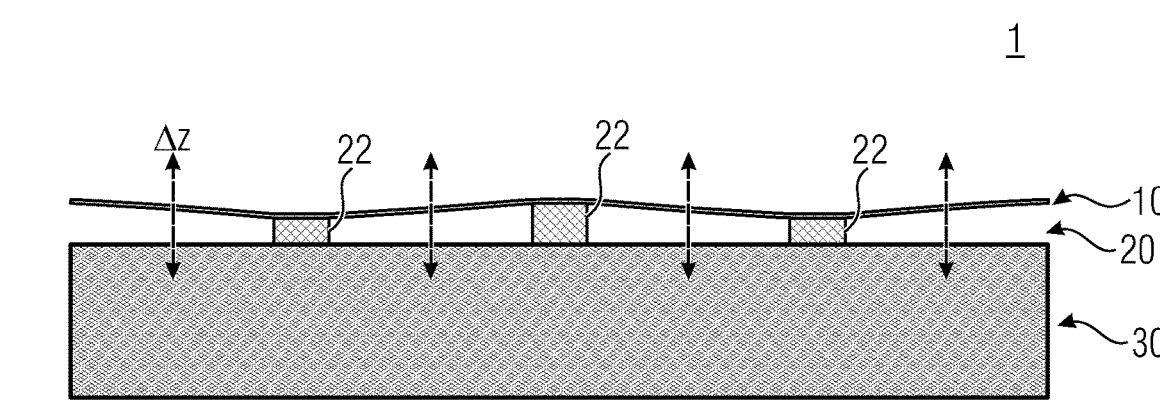
wp#2
Fig. 7B
wp#3
Fig. 7C

PRESSURE SENSING DEVICE

CROSS-REFERENCE TO RELATED APPLICATIONS

This application claims the benefit of European Patent Application No. 22168421, filed on Apr. 14, 2022, which application is hereby incorporated herein by reference.

TECHNICAL FIELD

Embodiments of the present disclosure relate to a pressure sensor device, e.g. a pressure sensor device for consumer applications. More specifically, embodiments relate to a pressure sensor device with multiple operating points, such as a pressure sensor device having a membrane (deflectable membrane structure) with multiple operating points. Further, embodiments relate to pressure sensor devices for use in Smartphones or Smartwatches measuring an extended wide range of pressure, for example atmospheric pressure and water depth.

BACKGROUND

On the field of pressure sensors for consumer applications, a majority of devices is made for operating at atmospheric pressure for use in Smartphones or Smartwatches, for example. A typical pressure range for this application is 0.3 Bar to 1.2 Bar (30 kPa to 120 kPa). With water resistant devices emerging in mobile applications, the requirement of water depth metering is adding on top of the standard atmospheric range. Due to its limitation to atmospheric pressure range, that device cannot resolve a water depth of several 10 meters, which translates into several Bar (several 100 kPa) of pressure load. In common pressure sensing devices a second pressure sensor is required to address the water metering scenario, in order to measure an extended pressure range created by the water metering. This is adding size, complexity and costs to the entire system, especially in mobile applications.

Consequently, there is a need in the art to provide a (single) pressure sensor device which can measure an increased or extended pressure range, e.g. atmospheric pressure with high accuracy and water depth.

Such a pressure sensing device should provide a good tradeoff between high measuring accuracy and low implementation effort, such as inexpensive (low cost) manufacturing processes.

Such a need can be solved by the pressure sensing device according to the independent claims.

Further, specific implementations of the pressure sensing device are defined in the dependent claims.

SUMMARY

According to an embodiment, a pressure sensing device comprises a deflectable membrane structure configured to provide a deflection dependent output signal based on a pressure load, and a mechanical abutment structure for adjusting a spring constant of the deflectable membrane structure depending on the deflection of the deflectable membrane structure, wherein the mechanical abutment structure is configured to provide an abutting condition of the deflectable membrane structure, when the deflection of the deflectable membrane structure exceeds a deflection threshold, wherein the abutting condition results in a change from the first spring constant to an increased, second spring constant of the deflectable membrane structure.

With increasing pressure, the membrane deflection increases based on the (first) spring constant of the membrane structure and reaches an abutting condition by means of the mechanical abutment structure, wherein the abutting condition results in an increased (second) spring constant of the membrane structure.

According to an embodiment, the pressure sensing device comprises a counter structure, which vertically opposes the deflectable membrane structure, wherein the mechanical abutment structure is formed as a bump or a plurality of bumps between the deflectable membrane structure and the counter structure.

According to the embodiment, with increasing pressure and reaching the abutting condition, the deflectable membrane abuts (is fixed) by means of the mechanical abutment element(s) to a counter structure so that the deflectable membrane structure is (for higher pressure levels) divided in a plurality (at least two) of membrane subregions resulting in an increased spring constant of the membrane structure.

According to an embodiment, the deflectable membrane structure comprises a first membrane element and a second, vertically spaced membrane element, wherein the mechanical abutment structure is fixed to the first or second membrane element and is arranged between the first and second membrane element. According to the embodiment, the first membrane element (having the (first) spring constant) reaches with an increasing pressure load an abutting condition (by means of the mechanical abutment structure) with the second membrane element, wherein the first membrane element of the deflectable membrane structure abuts (is fixed) by means of the mechanical abutment element(s) to the second membrane element of the deflectable membrane. Thus, the abutting condition of the first and second membrane element results in an increased (second) spring constant of the deflectable membrane structure (with the abutted first and second membrane element resulting in a combined (=increased) spring constant).

According to an embodiment, a pressure sensing device comprises a deflectable membrane structure configured to provide a deflection dependent output signal based on a pressure load, wherein the deflectable membrane structure comprises a border region and a center region, wherein the border region of the deflectable membrane structure has a higher rigidity than a center region of the deflectable membrane structure, wherein the center region of the deflectable membrane structure is configured to provide a first spring constant of the deflectable membrane structure, and wherein the border region of the deflectable membrane structure is configured to provide a second, increased spring constant of the deflectable membrane structure.

According to the embodiment, the deflectable membrane structure comprises a border region having a high(er) rigidity and a center region having a low(er) rigidity, so that the membrane structure provides for different pressure ranges different rigidities (spring constants). The first, low(er) spring constant of center region of the deflectable membrane is assigned to a first, higher sensitivity of the pressure sensing device, wherein the second, higher spring constant of the border region of the deflectable membrane is assigned to a second, lower sensitivity of the pressure sensing device. Thus, the pressure sensor output shows two different sensitivity values at working point (range) #1 and working point (range) #2 (with a continuous transition or switching between #1 and #2). The different working points #1 and #2 may be related to the atmospheric pressure range (#1) and the extended pressure range (#2), for example.

BRIEF DESCRIPTION OF THE DRAWINGS

In the following, embodiments of the present disclosure are described in more detail with reference to the figures, in which:

FIGS. 6A-6C show schematic cross-sectional views of a pressure sensing device according to a further embodiment in different operation conditions;

FIGS. 7A-7C show schematic cross-sectional views of a pressure sensing device according to a further embodiment in different operation conditions;

Figure 1A:
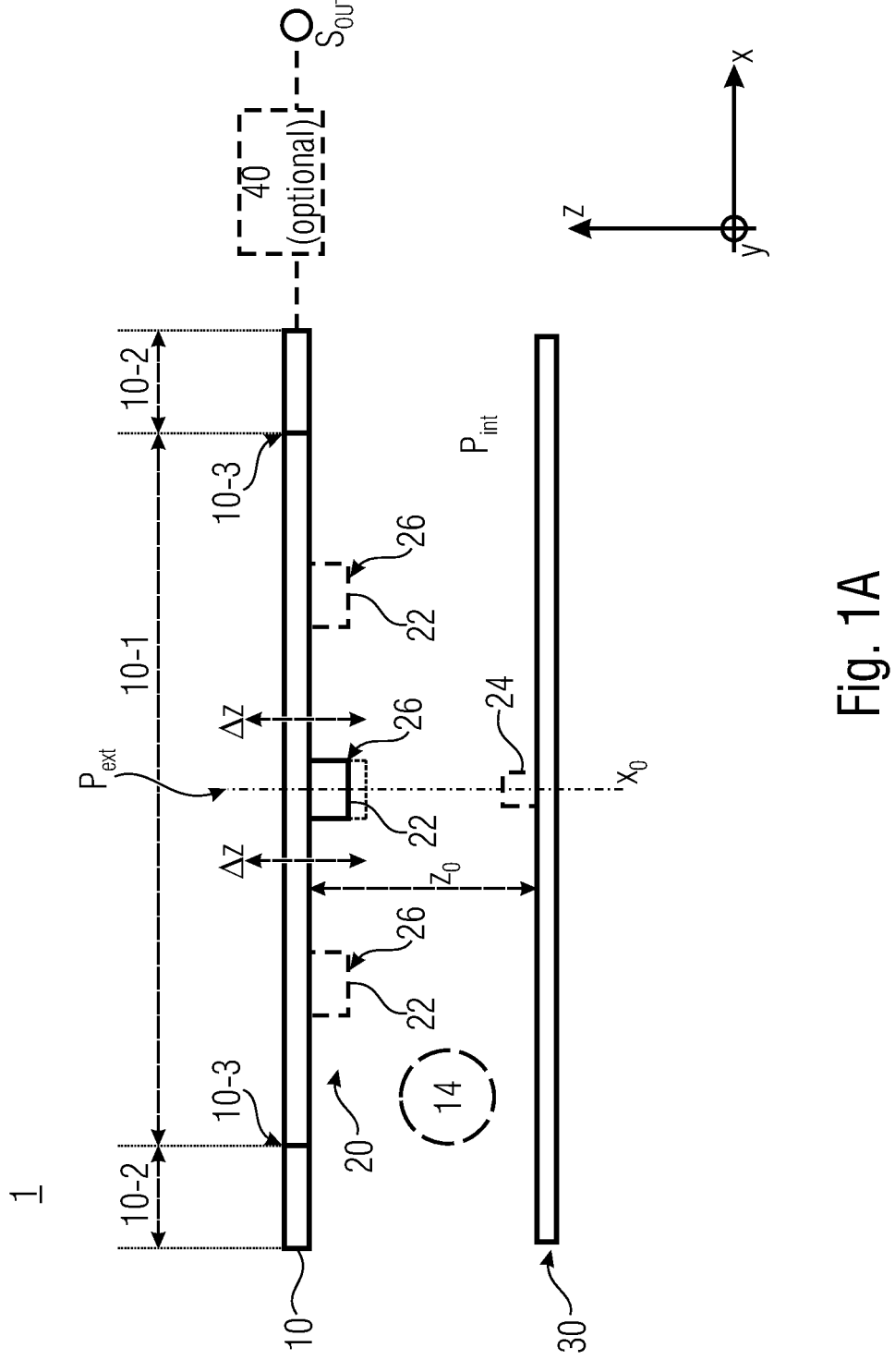
FIGS. 1A-1B show schematic cross-sectional views of a pressure sensing device according to an embodiment.

With respect to the figures, it is pointed out that the drawings are only schematic views and are not (necessarily) drawn to scale.

Before discussing the present embodiments in further detail using the drawings, it is pointed out that in the figures and the specification identical elements and elements having the same functionality and/or the same technical or physical effect are usually provided with the same reference numbers or are identified with the same name, so that the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

In the description of the embodiments, terms and text passages placed in brackets are to be understood as further exemplarily explanations, configurations, additions and/or alternatives.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, wherein the x-y-plane corresponds, i.e. is parallel, to a reference plane (=x-y-plane), e.g. a main surface region of a membrane structure (in an undeflected condition), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction or a direction parallel to (or in) the x-y-plane, wherein the term "vertical" means a direction parallel to the z-direction.

Figure 1B:
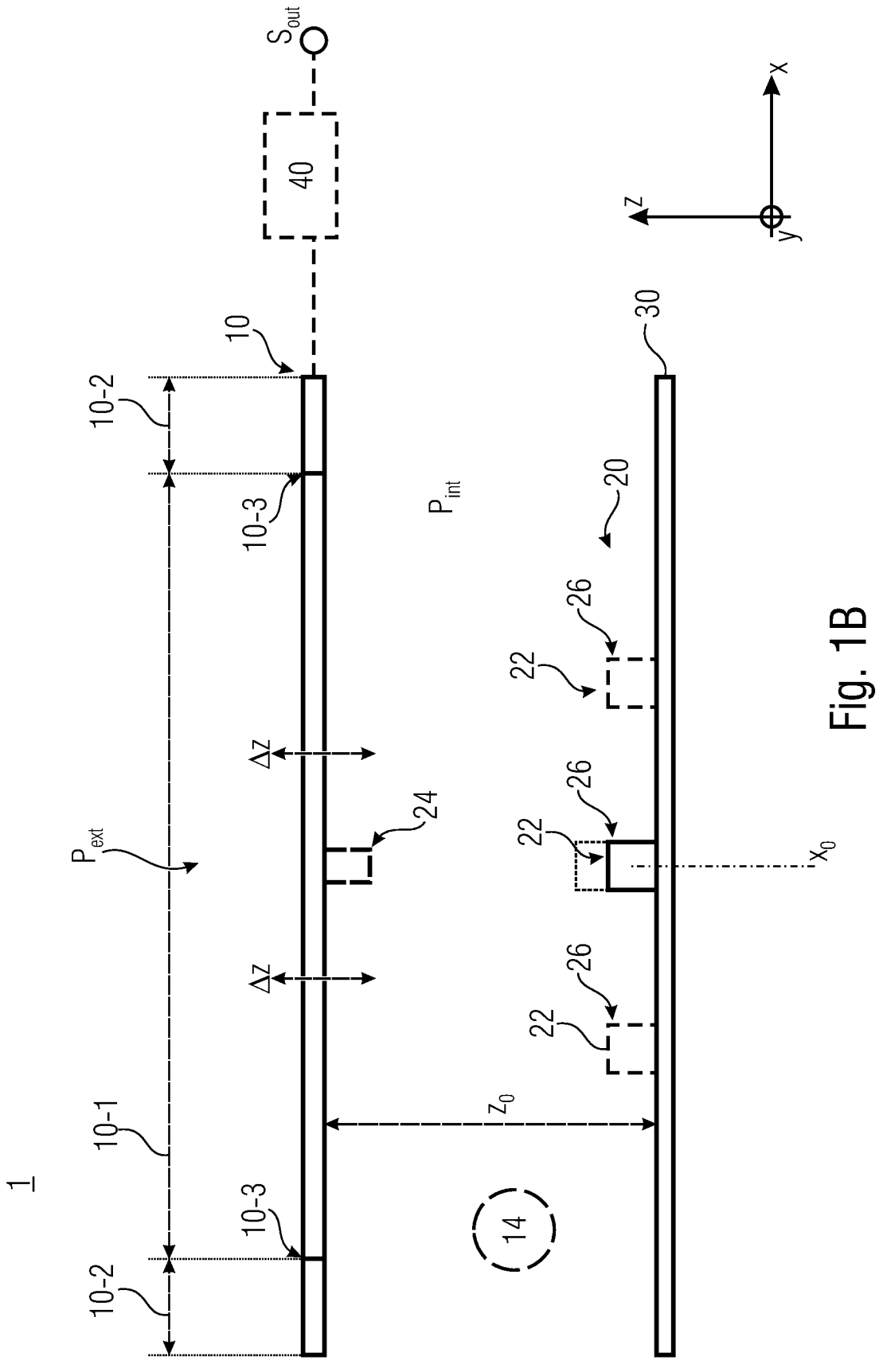

FIGS. 1A-1B show schematic cross-sectional views of a pressure sensing device 1 according to an embodiment. According to the embodiment, the pressure sensing device 1 comprises a deflectable membrane structure 10 configured to provide a deflection dependent output signal $S_{out}$ based on a pressure load $P_{ext}$, and comprises a mechanical abutment structure 20 for adjusting a spring constant of the deflectable membrane structure 10 depending on the deflection $\Delta z$ of the deflectable membrane structure 10, wherein the mechanical abutment structure 20 is configured to provide an abutting condition of the deflectable membrane structure 10, when a deflection $\Delta z$ of the deflectable membrane structure 10 exceeds a deflection threshold, wherein the abutting condition results in a change from the first spring constant to an increased second spring constant of the deflectable membrane structure 10.

With increasing pressure $P_{ext}$, the membrane deflection $\Delta z$ increases based on the (first) spring constant of the membrane structure 10 and reaches an abutting condition by means of the mechanical abutment structure 20, wherein the abutting condition results in an increased (second) spring constant of the membrane structure 10. The first, lower spring constant of the deflectable membrane 10 is assigned to a first, higher sensitivity of the pressure sensing device 1, wherein the second, higher spring constant of the deflectable membrane 10 is assigned to a second, lower sensitivity of the pressure sensing device 1. The abutting condition forms the switching point between the two sensitivity conditions of the deflectable membrane 10. Thus, the pressure sensor output shows two different sensitivity values at working point (range) #1 and working point (range) #2 with a switching at the abutting condition. The different working points #1 and #2 may be related to the atmospheric pressure range (#1) and the extended pressure range (#2), for example.

The deflectable membrane structure 10 may comprise a thickness between 0.01 and 5 μm and or 0.1 and 2 μm. For example, the diameter (lateral extension) of the deflectable membrane structure 10 may be between 100 μm and 10 μm or 70 μm and 30 μm or 6 μm and 40 μm, for example. The counter structure 30 and the deflectable membrane structure 10 (in an undeflected condition) may be arranged parallel to each other (and parallel to the reference plane) and in a vertical distance $Z_0$. The vertical distance $Z_0$ between the counter structure 30 and the deflectable membrane structure 10 may be (in an undeflected condition) in a range between 0.01 and 0.5 μm or between 0.1 and 5 μm, for example (e.g., depending on the respective technology option).

According to an embodiment, the deflectable membrane structure 10 may comprise a rectangular or square shape, a circular shape or a convex (or regular convex) polygon shape. Thus, the first spring constant may be based on size, thickness and shape of the deflectable membrane 10, wherein the second spring constant may be additionally based on the position and number of the mechanical abutment structure 20.

According to an embodiment, the pressure sensing device 1 is configured to measure a plurality (=two or more) of pressure ranges, for example, a first pressure range and a second pressure range with minimal implementation effort. The first pressure range may correspond to an atmospheric pressure range, for example between 0.3 Bar and 1.2 Bar, and the second pressure range may correspond to an extended pressure range, for example between 1.2 Bar and 6 Bar.

According to an embodiment as further shown in FIGS. 1A-1B, the pressure sensing device 1 may comprise a counter structure 30, which vertically opposes the deflectable membrane structure 10 (with the vertical distance $Z_0$), wherein the mechanical abutment structure 20 is formed as a bump or a plurality of bumps 22 between the deflectable membrane structure 10 and the counter structure 30. The counter structure 30 may comprise a support or carrier structure, such as a substrate that limits the movement or displacement $\Delta z$ of the deflectable membrane structure 10 in the abutting condition. By arranging a plurality of bumps 22 between the deflectable membrane structure 10 and the counter structure 30 a direct contact of the deflectable membrane structure 10 with the counter structure 30 can (usually) be avoided in the abutting condition.

As indicated above, the mechanical abutment structure 20 may comprise or may be formed as a bump or plurality of bumps 22 between the movable membrane structure 10 and the opposing counter structure 30. According to embodiments of the present disclosure, a bump 22 may be equally regarded as a piston or an elevation for providing a respective point contact (or small-area contact), or may be equally regarded as ridge or strip for providing a respective line contact between the movable membrane structure 10 and the counter structure 30.

According to an embodiment as exemplary shown in FIGS. 1A-1B, the mechanical abutment structure 20 is mechanically fixed to at least one of the membrane structure 10 and the counter structure 30. Thus, the element(s) 22 of the mechanical abutment structure 20 may be mechanically fixed either to the membrane structure 10 or the counter structure 30. Further, in case of several elements, a part of the elements 22 of the mechanical abutment structure 20 may be mechanically fixed to the membrane structure 10 and a further part of the elements 22 of the mechanical abutment structure 20 may be mechanically fixed to the counter structure 30.

Thus, according to the embodiment, a single pressure sensing device 1 is proposed that is capable of measuring, for example, the atmospheric pressure range with excellent accuracy and the extended pressure range (under the abutting condition of the deflectable membrane structure 10), e.g., created by water metering. The pressure sensing device 1 is a membrane-based transducer, which translates the (vertical) membrane displacement $\Delta z$ (based on the applied external atmospheric pressure load $P_{ext}$) into an electrical signal $S_{OUT}$, such as a voltage or current. The deflection of the membrane structure 10 can be capacitively, piezoelectrically and/or piezoresistively read out, for example. Consequently, the pressure value can be calculated.

According to an embodiment, the deflectable membrane structure 10 may comprise a deflectable portion 10-1 and a border region 10-2, wherein the border region 10-2 is mechanically coupled or fixed to (anchored to) a support or carrier structure (e.g., a substrate). The deflectable portion 10-1 has a border line 10-3. The deflectable membrane structure 10 may be arranged to close a cavity 14 and is exposed to the environmental atmosphere in form of the external pressure load $P_{ext}$. The deflectable membrane structure 10 of the pressure sensing device 1 may be arranged to provide a hermetically closed configuration with the cavity 14 having a reduced low atmospheric pressure (e.g., vacuum or near vacuum) $P_{int}$ with an atmospheric pressure of about or below 3 mbar or 1 mbar.

The term membrane "structure" 10 is intended to illustrate that the membrane structure 10 may comprise a semi-conductive or conductive layer or, also, a layer sequence or layer stack having a plurality of different (semi-conductive, conductive and/or insulating) layers. Based on the readout type of the membrane structure 10, at least one of the layers is electrically conductive, e.g., comprises a metallization layer and/or a semi-conductive layer, e.g., a polysilicon layer, or may comprise or may be formed by a piezoelectric material. The deflectable membrane structure 10 may be exposed to the environmental atmosphere, i.e., the external pressure load $P_{ext}$.

Thus, the deflection $\Delta z$ of the deflectable membrane structure 10 (i.e., of the deflectable portion 10-1 of the deflectable membrane structure 10) is based on the applied external pressure load $P_{ext}$. The deflection $\Delta z$ of the deflectable membrane structure 10 can then be detected and capacitively, piezo-electrically or piezo-resistively read-out, for example, in order to provide a corresponding (analog or AD-converted digital) output signal $S_{OUT}$ of the pressure sensing device 1. The deflection $\Delta z$ of the deflectable membrane structure 10 is (generally) caused by an atmospheric (or static) pressure change in the environment.

In case, the mechanical abutment structure 20 comprises a single bump 22, such a single bump 22 may be arranged in the center (centroid) $X_0$ of the deflectable membrane structure 10, for example. In case the mechanical abutment structure comprises a plurality of bumps 22, the different bumps 22 may be aligned with or may be arranged on a contour line of the deflectable membrane structure 10.

At any membrane position, the contour line of membrane deflection (based on $P_{ext}$) may be regarded as the points or the line with identical local deflection. In case of a circular membrane structure 10 with a circular membrane edge, the contour lines are circles around the membrane center $X_0$ and thus precisely parallel to the membrane edge. However, the contour lines do not always precisely follow the membrane edge, e.g., the corners of a rectangular membrane (see, for example, FIG. 3, which shows a rectangular (square) membrane structure with rounded corners).

Thus, in case of a plurality of bumps 22, the position of the bumps 22 may be arranged, e.g. equally spaced, on the contour line of the deflectable membrane structure 10. In case the mechanical abutment structure 20 is formed as a ridge or strip 22 and provides a line contact in the abutting condition of the deflectable membrane structure 10 with the counter structure 30, the ridge or strip 22 may be arranged to provide a line contact which corresponds to or is aligned with a contour line of the deflectable membrane structure 10.

The mechanical abutment structure 20 may be arranged in a distance X to the center $X_0$ of the deflectable membrane structure, wherein the distance is in a radial direction within a first third (33.3%) or, for example, within 5% to 40% of the radius, i.e., within 5% to 40% of the distance $X_1$ from the center point $X_0$ to the border line 10-3 of the deflectable portion 10-1 of the deflectable membrane structure 10.

According to the embodiment as shown in FIGS. 1A-1B, the deflectable membrane structure 10 and the counter structure 30 may be configured to abut the mechanical abutment structure 20 from opposing sides, when the deflection Δz of the deflectable membrane structure 10 exceeds the deflection threshold, so that the mechanical abutment structure 20 is arranged between and in mechanical contact with the deflectable membrane structure 10 and the counter structure 30.

With increasing pressure load $P_{ext}$, the membrane deflection Δz increases and reaches the abutting condition by means of the mechanical abutment structure 20, wherein the deflectable membrane structure 10 and the counter structure 30 abut the mechanical abutment structure 20 from opposing sides. The abutting condition results in an increased spring constant of the deflectable membrane structure 10.

According to an embodiment as optionally shown in FIG. 1A, the mechanical abutment structure 20 may comprises a plurality of bumps 22, which are fixed to the deflectable membrane structure 10 between the deflectable membrane structure 10 and the counter structure 30, wherein the mechanical abutment structure 20 comprises a counter bump 24, which is fixed to the counter structure 30 between the deflectable membrane structure 10 and the counter structure 30, and which is aligned with one of the membrane bumps 22. Thus, the counter bump 24 may be part of the element(s) 22, 24 of the mechanical abutment structure 20.

Thus, according to the embodiment as optionally shown in FIG. 1A, the mechanical abutment structure 20 may be configured to provide the abutting condition of the deflectable membrane structure 10 by means of the bump 22 together with the aligned counter-bump 24, when the deflection Δz of the deflectable membrane structure 10 exceeds the deflection threshold, and wherein the mechanical abutment structure 20 is configured to provide a further abutting condition of the deflectable membrane structure 10, when the deflection Δz of the deflectable membrane structure 10 exceeds a further deflection threshold and a remaining bump 22 (or further bumps 22) of the mechanical abutment structure 20 is (are) arranged between the deflectable membrane structure 10 and a counter structure 30 and is (are) arranged in mechanical contact with the deflectable membrane structure 10 and a counter structure 30. Thus, the further abutting condition results in a change from the (increased) second spring constant to a further increased, third spring constant of the deflectable membrane structure 10.

The first, low spring constant of the deflectable membrane 10 is assigned to a first, high sensitivity of the pressure sensing device 1, wherein the second, increased spring constant of the deflectable membrane 10 is assigned to a second, reduced sensitivity of the pressure sensing device 1, and wherein the third, further increased spring constant of the deflectable membrane 10 is assigned to a third, further reduced sensitivity of the pressure sensing device 1. The abutting conditions form the switching points between the three sensitivity conditions of the deflectable membrane 10. Thus, the pressure sensor output shows three different sensitivity values at working points #1, #2 and #3 with the respective switching at the abutting condition(s). The different working points #1, #2 and #3 may be related to different adjoining pressure ranges, such as a first pressure range (#1) and the extended, second and third pressure ranges (#2 and #3).

Consequently, a plurality of abutting conditions can be achieved with correspondingly set (and increased) spring constants of the deflectable membrane (diaphragm) structure 10 for providing a wide (extended) pressure range. The corresponding deflection state can be associated with a corresponding pressure range.

According to an embodiment as optionally shown in FIG. 1B, the mechanical abutment structure 20 may comprises a plurality of bumps 22, which are fixed to the counter structure 30 between the deflectable membrane structure 10 and the counter structure 30, wherein the mechanical abutment structure 20 comprises the counter bump 24, which is fixed to the deflectable membrane structure 10 between the deflectable membrane structure 10 and the counter structure 30, and which is aligned with one of the counter structure bumps 22.

Thus, according to the embodiment as optionally shown in FIG. 1B, the mechanical abutment structure 20 may be configured to provide the abutting condition of the deflectable membrane structure 10 by means of the bump 22 together with the aligned counter-bump 24, when the deflection Δz of the deflectable membrane structure 10 exceeds the deflection threshold, and wherein the mechanical abutment structure 20 is configured to provide a further (second) abutting condition of the deflectable membrane structure 10, when the deflection Δz of the deflectable membrane structure 10 exceeds a further deflection threshold and a remaining bump 22 (or further bumps 22) of the mechanical abutment structure 20 is (are) arranged between the deflectable membrane structure 10 and a counter structure 30 and is (are) arranged in mechanical contact with the deflectable membrane structure 10 and a counter structure 30. Thus, the further abutting condition results in a change from the (increased) second spring constant to a further increased, third spring constant of the deflectable membrane structure 10.

The first, low spring constant of the deflectable membrane 10 is assigned to a first, high sensitivity of the pressure sensing device 1, wherein the second, increased spring constant of the deflectable membrane 10 is assigned to a second, reduced sensitivity of the pressure sensing device 1, and wherein the third, further increased spring constant of the deflectable membrane 10 is assigned to a third, further reduced sensitivity of the pressure sensing device 1. The abutting conditions form the switching points between the three sensitivity conditions of the deflectable membrane 10. Thus, the pressure sensor output shows three different sensitivity values at working points #1, #2 and #3 with the respective switching at the abutting condition(s). The different working points #1, #2 and #3 may be related to different adjoining pressure ranges, such as a first pressure range (#1) and the extended, second and third pressure ranges (#2 and #3).

Consequently, a plurality of abutting conditions can be achieved with correspondingly set (and increased) spring constants of the deflectable membrane (diaphragm) structure 10 for providing a wide (extended) pressure range. The corresponding deflection state can be associated with a corresponding pressure range.

According to an embodiment as optionally shown in FIG. 1B, the mechanical abutment structure 20 may comprises a plurality of bumps 22, which are fixed to the counter structure 30 between the deflectable membrane structure 10 and the counter structure 30, wherein the mechanical abutment structure 20 comprises the counter bump 24, which is fixed to the deflectable membrane structure 10 between the deflectable membrane structure 10 and the counter structure 30, and which is aligned with one of the counter structure bumps 22.

Thus, according to the embodiment as optionally shown in FIG. 1B, the mechanical abutment structure 20 may be configured to provide the abutting condition of the deflectable membrane structure 10 by means of the bump 22 together with the aligned counter-bump 24, when the deflection $\Delta z$ of the deflectable membrane structure 10 exceeds the deflection threshold, and wherein the mechanical abutment structure 20 is configured to provide a further (second) abutting condition of the deflectable membrane structure 10, when the deflection $\Delta z$ of the deflectable membrane structure 10 exceeds a further deflection threshold and a remaining bump 22 (or further bumps 22) of the mechanical abutment structure 20 is (are) arranged between the deflectable membrane structure 10 and a counter structure 30 and is (are) arranged in mechanical contact with the deflectable membrane structure 10 and a counter structure 30. Thus, the further abutting condition results in a change from the (increased) second spring constant to a further increased, third spring constant of the deflectable membrane structure 10.

The first, low spring constant of the deflectable membrane 10 is assigned to a first, high sensitivity of the pressure sensing device 1, wherein the second, increased spring constant of the deflectable membrane 10 is assigned to a second, reduced sensitivity of the pressure sensing device 1, and wherein the third, further increased spring constant of the deflectable membrane 10 is assigned to a third, further reduced sensitivity of the pressure sensing device 1. The abutting conditions form the switching points between the three sensitivity conditions of the deflectable membrane 10. Thus, the pressure sensor output shows three different sensitivity values at working points #1, #2 and #3 with the respective switching at the abutting condition(s). The different working points #1, #2 and #3 may be related to different adjoining pressure ranges, such as a first pressure range (#1) and the extended, second and third pressure ranges (#2 and #3).

Consequently, a plurality of abutting conditions can be achieved with correspondingly set (and increased) spring constants of the deflectable membrane (diaphragm) structure 10 for providing a wide (extended) pressure range. The corresponding deflection state can be associated with a corresponding pressure range.

According to an embodiment the mechanical abutment structure 20 comprises a plurality of bumps 22, which are fixed to the deflectable membrane structure 10 or to the counter structure 30 between the deflectable membrane structure 10 and the counter structure 30, wherein at least one of the bumps 22 comprises an increased (vertical) height when compared to the remaining bumps 22.

The technical effect of providing a bump 22 (of the plurality of bumps 22) with an increased (vertical) height when compared to the remaining bumps 22 corresponds to the provision of the bump 22 together with the aligned counter-bump 24 (as described above).

According to the embodiment, the mechanical abutment structure 20 may be configured to provide the (first) abutting condition of the deflectable membrane structure 10 by means of the bump 22 with the increased (vertical) height, when the deflection of the deflectable membrane structure 10 exceeds the deflection threshold and the bump 22 with the increased height is arranged between and in mechanical contact with the deflectable membrane structure 10 and the counter structure 30. The mechanical abutment structure 20 is configured to provide a further (second) abutting condition of the deflectable membrane structure 10, when the deflection $\Delta z$ of the deflectable membrane structure 10 exceeds a further deflection threshold and the remaining bump(s) of the mechanical abutment structure 20 is (are) arranged between the deflectable membrane structure 10 and a counter structure 30 and in mechanical contact with the deflectable membrane structure 10 and a counter structure 30, wherein the further abutting condition results in a change from the increased, second spring constant to a further increased, third spring constant of the deflectable membrane structure 10. Thus, the mechanical abutment structure 20 is configured to provide a further change from the second spring constant to an increased third spring constant of the deflectable membrane structure 10, when the deflection $\Delta z$ of the deflectable membrane structure 10 exceeds a further deflection threshold and the remaining bump(s) 22 of the abutment structure 20 is (are) arranged between and in mechanical contact with the deflectable membrane structure 10 and the counter structure 30.

Thus, the first, low spring constant of the deflectable membrane 10 is assigned to a first, high sensitivity of the pressure sensing device 1, wherein the second, increased spring constant of the deflectable membrane 10 is assigned to a second, reduced sensitivity of the pressure sensing device 1, and wherein the third, further increased spring constant of the deflectable membrane 10 is assigned to a third, further reduced sensitivity of the pressure sensing device 1. The abutting conditions form the switching points between the three sensitivity conditions of the deflectable membrane 10. Thus, the pressure sensor output shows three different sensitivity values at working points #1, #2 and #3 with the respective switching at the abutting condition(s). The different working points #1, #2 and #3 may be related to different adjoining pressure ranges, such as a first pressure range (#1) and the extended, second and third pressure ranges (#2 and #3).

Consequently, a plurality of abutting conditions can be achieved with correspondingly set (and increased) spring constants of the deflectable membrane (diaphragm) structure 10 for providing a wide (extended) pressure range. The corresponding deflection state can be associated with a corresponding pressure range.

According to an embodiment, the deflectable membrane structure 10 comprises a first membrane element and a second vertically spaced membrane element, wherein the mechanical abutment structure 20 is fixed to either the first or the second membrane element and is arranged between the first and the second membrane element.

According to an embodiment as shown in FIGS. 1A-1B, the deflectable membrane structure 10 may form the first membrane element and the counter structure 30 may form the second vertically spaced membrane element, wherein the mechanical abutment structure 20 is fixed to the first or the second membrane element and is arranged between the first and the second membrane element 10, 30. According to the embodiment, the mechanical abutment structure 20 is arranged between and in mechanical contact with the first and second element of the deflectable membrane structure 10, 30 and provides the abutting condition of the deflectable membrane structure 10, when the deflection $\Delta z$ of the deflectable membrane structure 10, 30 exceeds the deflection threshold, wherein the abutting condition results in the change from the first spring constant to the increased, second spring constant of the deflectable membrane structure 10.

According to the embodiment, the first membrane element 10 (having the (first) spring constant) reaches with an increasing pressure load an abutting condition (by means of the mechanical abutment structure) with the second membrane element 30, wherein the first membrane element 10 of the deflectable membrane structure abuts (is fixed) by means of the mechanical abutment element(s) 22 to the second membrane element 30 of the deflectable membrane. Thus, the abutting condition of the first and second membrane element 10, 30 results in an increased (second) spring constant of the deflectable membrane structure (with the abutted first and second membrane element 10, 30 resulting in a combined (=increased), second spring constant). The second spring constant may correspond to a combination (sum) of the spring constant of the first membrane element 10 (=first spring constant) and the spring constant of the second membrane element 30.

According to an embodiment, the bumps 22 of the mechanical abutment structure 20 may comprise an anti-sticking surface measure 26. The anti-sticking surface measure 26 may be a thin film (coating) or thin films (coatings) on the abutting (contacting) surfaces of the deflectable membrane structure 10, the mechanical abutment structure 20 and/or the counter structure 30. Alternatively, or additionally, the anti-sticking surface measure 26 may comprise thin films and/or bumps 22 with chemically (hydrophobic) or mechanically (increased roughness) modified boundary layers, such as hydrophobic boundary layers or boundary layers with an increased (surface) roughness. Thus, the anti-sticking surface measure 26 may avoid a so-called soft sticking of the mechanical abutment structure 20 to the deflectable membrane structure 10 or to the counter structure 30. In addition, surface modifications by plasma or atomic layer deposition (ALD) are possible for the anti-sticking surface measure 26.

According to an embodiment as shown in FIGS. 1A-1B, the different spring constants of the deflectable membrane structure 10 define different working points (working ranges) of the deflectable membrane structure 10, which are associated with different pressure load ranges.

Thus, the different spring constants of the deflectable membrane structure 10 are associated to different sensitivity ranges of the deflectable membrane structure 10. For example, the deflectable membrane structure 10 responds or reacts differently depending on the incident or applied pressure load $P_{ext}$.

The first, low spring constant of the deflectable membrane 10 is assigned to a first, high sensitivity of the pressure sensing device 1, wherein the second, increased spring constant of the deflectable membrane 10 is assigned to a second, reduced sensitivity of the pressure sensing device 1, etc. The abutting condition(s) forms the switching point(s) between the different sensitivity conditions of the deflectable membrane 10. Thus, the pressure sensor output shows a plurality of different sensitivity values at working points #1, #2 and #3 with the respective switching at the abutting condition(s).

According to an embodiment, the pressure sensing device 1 may comprises a read-out circuitry (or ASIC) 40 for capacitively, piezo-resistively and/or piezo-electrically reading out the deflection dependent output signal $S_{out}$. Thus, the pressure sensing device 1 may provide the output signal $S_{out}$, wherein the pressure load dependent deflection $\Delta z$ of the deflectable membrane structure 10 of the pressure sensing device 1 may result a capacitance change, a piezo-resistance change and/or a piezoelectrically effected electrical charge.

In case of a capacitive pressure sensor device 1, the deflectable membrane structure 10 and the counter structure 30 may be positioned on a carrier substrate, and are separated and spaced apart from one another. The counter structure 30 may be formed as a counter electrode structure, which is more rigid than the deflectable membrane structure, is spaced apart at a distance D from the membrane structure, with the result that a capacitance $C_0$ can form between the deflectable membrane structure 10 and the counter structure (counter electrode structure=stator, backplate or counter electrode) 30. The non-clamped region 10-1 of the deflectable membrane structure 10 is referred to as the deflectable (=displaceable) or movable region (=active region) 10-1 of the deflectable membrane structure 10. A deflection $\Delta z$ of the membrane structure 10 in relation to the counter electrode structure 30 can then be detected and read-out as a capacitance change $\Delta C$ in order to provide a corresponding (analog or AD-converted digital) output signal $S_{out}$ of the pressure sensor device 1. The deflection $\Delta z$ of the membrane structure 10 is generally caused by an external pressure load (environmental static or atmospheric pressure) $P_{ext}$.

According to a further embodiment, the deflection or geometric deformation of the deflectable membrane structure 10 can also be read out, for example, by means of implanted, piezoresistive resistors in the deflectable membrane structure 10, wherein the specific resistance of the piezoresistive resistors changes based on the geometric deformation or deflection $\Delta z$ due to the mechanical stress caused by the deformation of the deflectable membrane structure in response to the applied pressure load $P_{ext}$. This change in resistance of the piezoresistive elements based on the pressure-related deflection $\Delta z$ of the deflectable membrane structure can be read-out. Generally, the piezoresistive elements may be connected to form a Wheatstone bridge circuit, for example, to maximize the output signal of the pressure sensing device 1 and reduce sensitivity to errors.

According to a further exemplary embodiment, the pressure sensor device 1 may be implemented as a piezoelectric pressure sensing device. The piezoelectric pressure sensing device 1 uses the piezoelectric effect to measure changes of the deflection $\Delta z$ of the membrane structure 10 by converting the changes into an electrical charge. The piezoelectric pressure sensing device has (usually) a (very) high DC output impedance and can be modelled as a proportional voltage source. The output voltage $S_{out}$ of the piezoelectric pressure sensing device is directly proportional to the applied pressure load $P_{ext}$ and the resulting deflection $\Delta z$ of the deflectable membrane structure.

According to the embodiments as shown in FIGS. 1A-1B, the pressure sensing device 1 may be implemented as single sensing device that is capable of measuring different pressure loads (atmospheric pressure values in the environment), e.g. measuring an atmospheric pressure range with high accuracy and an extended pressure range, e.g. created by water metering. The pressure sensing device 1 is a membrane-based transducer, which translates membrane displacement into an electrical output signal $S_{OUT}$, such as a voltage or current. Consequently, the pressure value can be calculated.

According to embodiments, the pressure sensing device 1 comprises a mechanical abutment structure 20 having bumps (pistons, etc.) 22 on the inner boundary of the deflectable membrane structure 10 (=the surface opposing the counter structure 30) or on the inner boundary of a counter structure 30 (=the surface opposing the membrane structure 10). These bumps are used to realize two or more working points (working ranges) of the pressure sensor device. A working point is defining the sensitivity of the deflectable membrane structure 10 with respect to a change of the applied pressure load $P_{ext}$. Basically, the sensing of a low pressure load (e.g., an atmospheric pressure) requires a high sensitivity over a relatively small pressure range, whereas the sensing of a high pressure load (e.g., water depth) requires a reduced sensitivity over a wide pressure range.

With the bumps (pistons, . . . ) 22 being designed properly, i.e. for providing a sufficiently large deflection range of the deflectable membrane structure 10 without an abutting condition, the deflectable membrane structure 10 will show a maximum compliance and, thus, a maximum sensitivity at the first working point #1, such as in the atmospheric pressure range. At this working point, the deflectable membrane structure 10 can move freely without achieving an abutting condition with the mechanical abutment structure 20. Once the deflectable membrane structure 10 comes into an abutting condition with the mechanical abutment structure 20, e.g. once the bumps 22 may contact to a counter structure (e.g., a substrate) 30 or any other rigid surface that limits its movement, the deflectable membrane structure 10 shows a different working point #2 with a reduced compliance and, thus, a reduced sensitivity. Consequently, a switched characteristic can be achieved that changes the compliance and, thus, the sensitivity of the deflectable membrane structure 10.

With the arrangement of the mechanical abutment structure 20, e.g. with the arrangement, size (e.g., diameter) and number of the bump(s) 22, the maximum travel/deflection $\Delta z$ of the deflectable membrane structure 10 can be defined as well as the pressure points where the switching between the working points #1, #2, . . . occurs.

More resulting technical effects of the pressure sensing device can be summarized as follows:

measurement of multiple pressure ranges with a different sensitivity/resolution on a single sensor system (MEMS+ASIC). No need to place multiple sensor systems;

reduced assembly and calibration effort as well as reduced footprint of a single system in comparison to a two-sensor solution;

the implementation can be achieved with productive technologies and with reduced development effort.

As described, the multiple working points #1, #2, . . . are achieved by bumps, pistons, etc. 22 with either free travel or contact to a rigid surface (counter structure) 30. Consequently, the spring constant of the membrane structure 10 is being changed with respect to membrane displacement $\Delta z$ and pressure load $P_{ext}$.

The present approach provides an area-neutral implementation of a pressure sensing device with a plurality of working points (working ranges).

In case of a capacitive pressure sensor device 1, the read-out of the membrane capacitance can be done by measuring the electrical capacitance between the moveable membrane structure 10 and a fixed counter electrode (the counter structure) 30. Moreover, a piezo-resistive or a piezo-electrical approach may also be used with the pressure sensor device 1. However, the capacitive read-out approach seems to be an appropriate approach for the proposed design with the switched pressure sensitivity.

Figure 2:
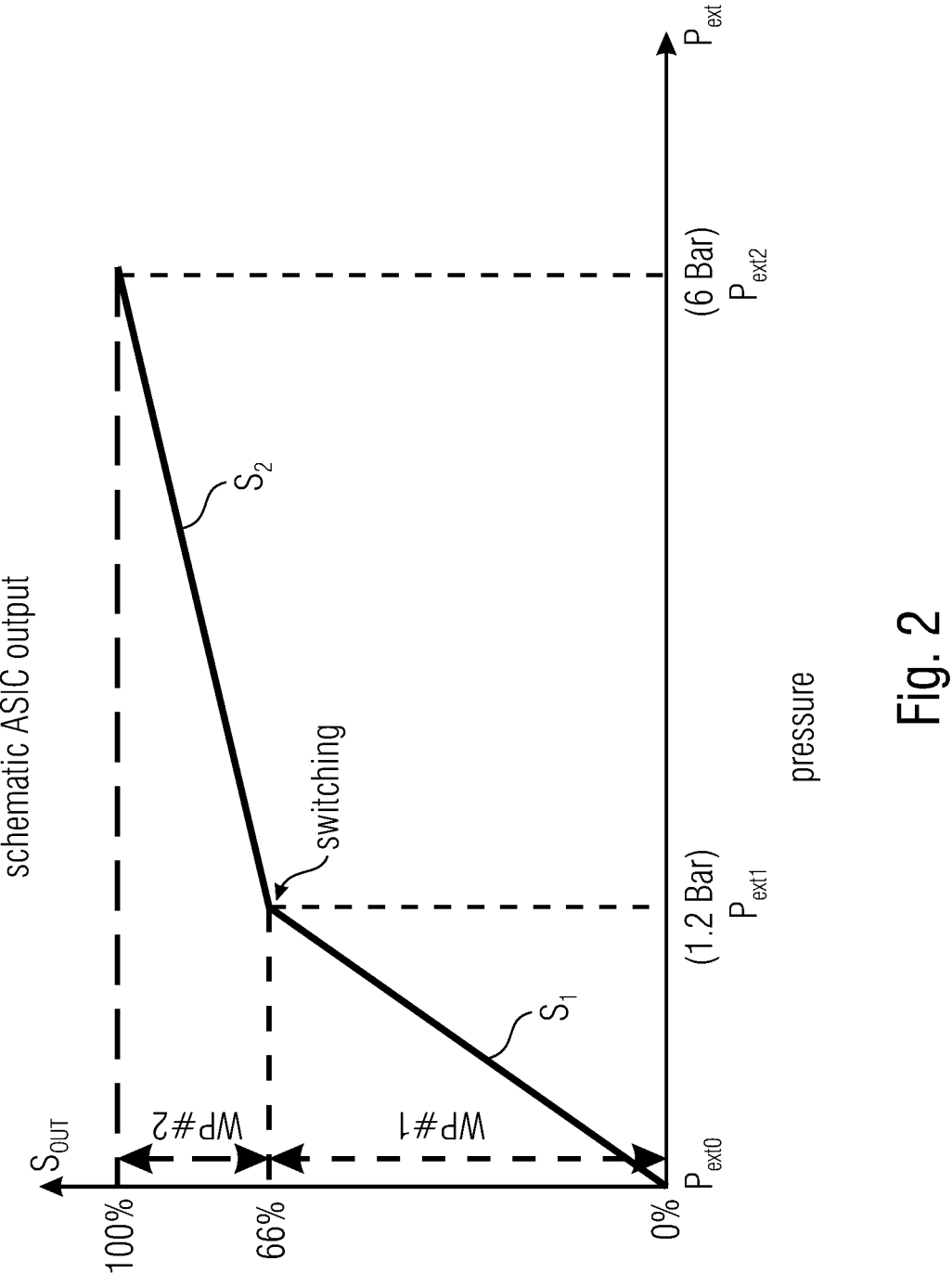
FIG. 2 shows a schematic graph of an ASIC output signal of the pressure sensing device according to an embodiment.

FIG. 2 shows a schematic graph for an output signal $S_{OUT}$ (e.g., an ASIC 40 output signal) over a pressure range $P_{ext}$ of the pressure sensing device 1 according to an embodiment. According to the basic principle of the proposed concept, the pressure sensor output $S_{OUT}$ shows two different sensitivity values $S_1$, $S_2$ at working point #1 and working point #2 with switching.

The first (low) spring constant of the deflectable membrane 10 is assigned to a first (high) sensitivity $S_1$ of the pressure sensing device 1, wherein the second, higher spring constant of the deflectable membrane 10 is assigned to a second, lower sensitivity $S_2$ of the pressure sensing device 1. The abutting condition forms the switching point between the two sensitivity conditions of the deflectable membrane 10. Thus, the pressure sensor output shows two different sensitivity values at working point (range) #1 and working point (range) #2 with a switching at the abutting condition. The different working points #1 and #2 may be related to the atmospheric pressure range (#1) and the extended pressure range (#2), for example.

The switching point between the sensitivity ranges and/or the different working points #1 and #2 may be hard-coded in the ASIC output signal $S_{out}$, e.g. in the LSBs (LSB=least significant bits). FIG. 2 shows that relation between the gradient of the graph and the sensitivity in that: the steeper the graph the higher the sensitivity.

The abscissa (x-axis) of the graph of FIG. 2 represents a pressure load $P_{ext}$ (e.g. in Bar) and the ordinate (y-axis) represents an ASIC output signal range (between 0 and 100%). The ordinate of the graph shows a first working point WP #1 between 0% and 66% of the signal level of the output $S_{out}$, and a second working point WP #2 between 66% and 100% of the signal level of $S_{out}$. The first working point WP #1 is assigned to a pressure load range $P_{ext}$ between a minimum pressure load value $P_{ext0}$ (e.g. 0 Bar or 0.3 Bar) and the pressure load value $P_{ext1}$ (e.g. 1.2 bar), which corresponds to the switching point. The second working point WP #2 is assigned to a pressure load range $P_{ext}$ between the pressure load value $P_{ext1}$, which corresponds to the switching point, and the a maximum (detectable) pressure load value $P_{ext2}$ (e.g. 6 bar), which corresponds to the 100%-value of the output Som. The pressure load value $P_{ext1}$ may be between 1 Bar and 1.4 Bar and about 1.2 Bar. The pressure load value $P_{ext2}$ may be between 5 Bar and 7 Bar and about 6 Bar.

In case of a capacitive pressure sensor device, the deflection $\Delta z$ of the membrane structure 10 capacitively detected with respect to the counter electrode structure 30 and can be read-out as a capacitance change $\Delta C$ in order to provide a corresponding (analog or AD-converted digital) output signal $S_{out}$ of the pressure sensor device 1.

Figure 3:
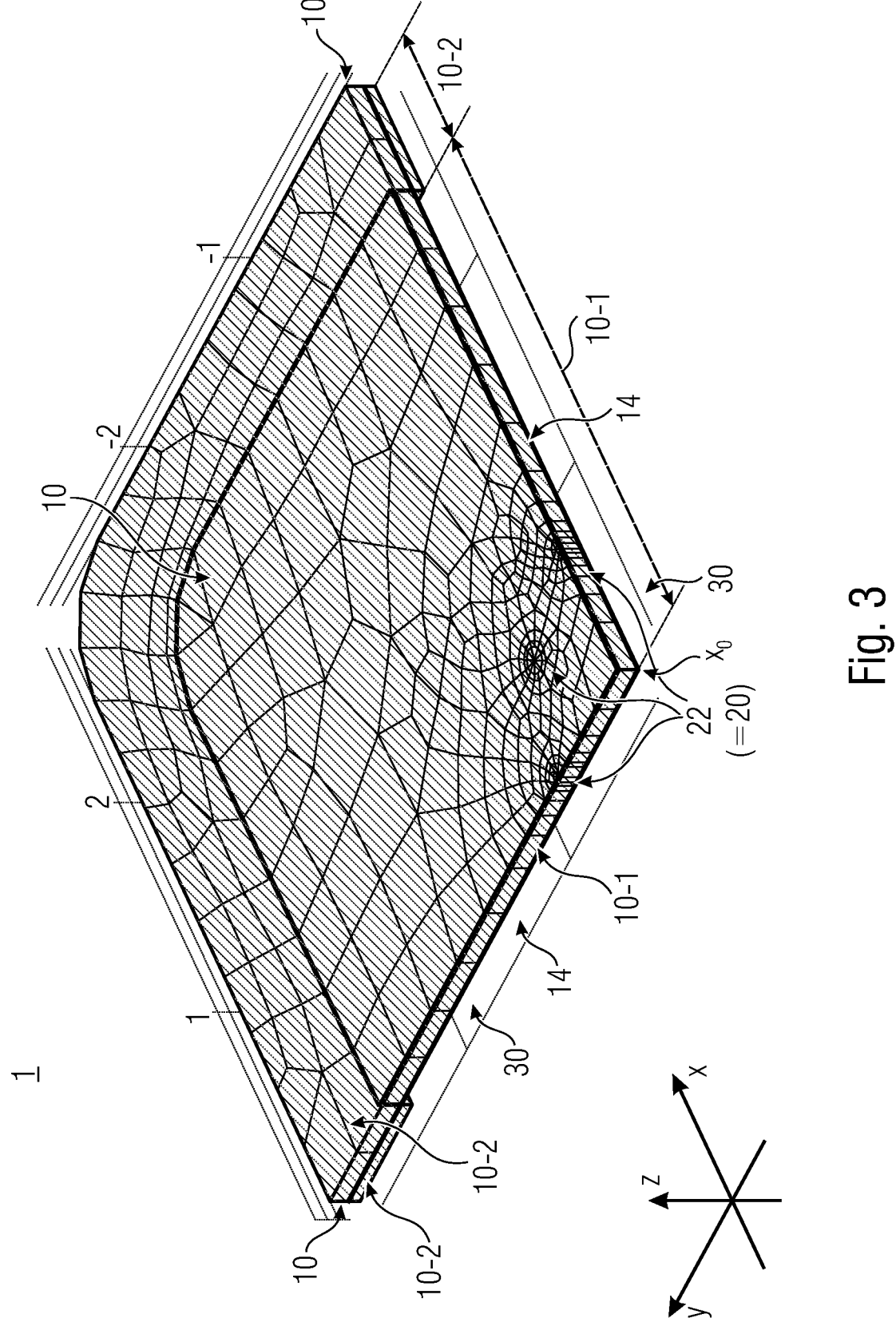
FIG. 3 shows a schematic partial 3D view of a part of a pressure sensing device according to an embodiment.

FIG. 3 shows a schematic partial 3D view of a pressure sensing device 1 according to an embodiment. As shown in FIG. 3, the pressure sensing device 1 exemplarily comprises a rectangular (square) membrane structure 10 with rounded corners. The deflectable membrane structure 10 may be arranged to close the cavity 14 and is exposed to the environmental atmosphere in form of the external pressure load $P_{ext}$. The deflectable membrane structure 10 may comprise a deflectable portion 10-1 and a border region 10-2, wherein the border region 10-2 is mechanically coupled or anchored to a support (anchor) or carrier structure (e.g., a substrate). The deflectable portion 10-1 has a border line 10-3.

Thus, in case of a plurality of bumps 22, the position of the bumps 22 may be arranged, e.g. equally spaced, on a contour line of the deflectable membrane structure. In case the mechanical abutment structure 20 is formed as a ridge or strip 22 and provides a line contact in the abutting condition of the deflectable membrane structure 10 with the counter structure 30, the ridge or strip 22 may be arranged to provide a line contact which corresponds to a contour line of the deflectable membrane structure 10.

The mechanical abutment structure 20 may be arranged in a distance to the center $X_0$ of the deflectable membrane structure, wherein the distance is in a radial direction within a first third (33.3%) or, for example, within 5% to 40% of the radius, i.e., within 5% to 40% of the distance from the center point $X_0$ to the border line 10-3 of the deflectable portion 10-1 of the deflectable membrane structure 10.

The membrane structure 10 as exemplarily shown in FIG. 3 may be formed as a square with rounded corners. The dimensions in FIG. 3 are purely exemplary, for principally illustrating the present sensor approach.

Figure 4:
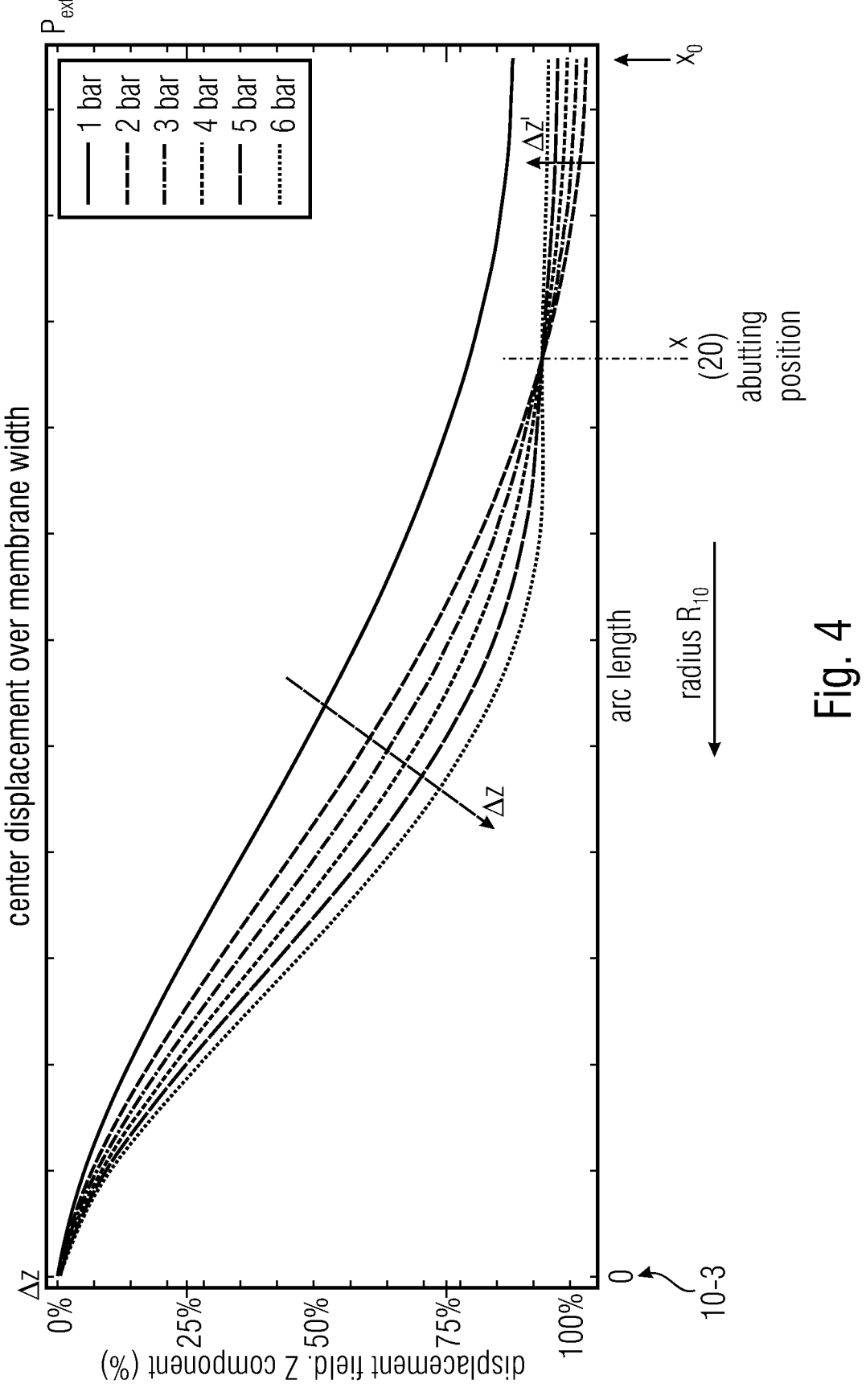
FIG. 4 shows a schematic graph of a pressure sensing device according to a further embodiment.

FIG. 4 shows a schematic graph illustrating the membrane displacement $\Delta z$ as a function of membrane position X for various pressure loads $P_{ext}$ of the pressure sensing device 1 according to an embodiment. The abscissa (x-axis) of the graph of FIG. 4 represents the displacement ($\Delta z$ and $\Delta z'$) based on the pressure load $P_{ext}$ (e.g. in Bar), wherein the ordinate (y-axis) represents the arc_length (membrane width or radius $R_{10}$) between the membrane fixation 10-3 and the membrane center $X_0$. In particular, FIG. 4 shows the center displacement $\Delta z$, $\Delta z'$ of the membrane structure 10 over the membrane width for various pressure loads. After bumps (pistons, . . . ) 22 make contact (abut), the center point $X_0$ is starting to lift ($\Delta z'$) for increasing pressure loads $P_{ext}$ (e.g., between 1 Bar and 6 Bar).

FIG. 4 provides a visualization of the center displacement $\Delta z$ of the membrane structure 10 at different pressure loads $P_{ext}$ and show the limited center displacement $\Delta z'$ of the membrane structure 10, after the bumps 22 are abutted to the counter structure 30. After bumps 22 abut, the center point $X_0$ is starting to lift (see center displacement $\Delta z'$) for an increasing pressure load $P_{ext}$.

The vertical displacement values (z-axis), the arc-length values and the pressure load values are purely exemplary value, for principally illustrating the present sensor approach.

Figure 5A:
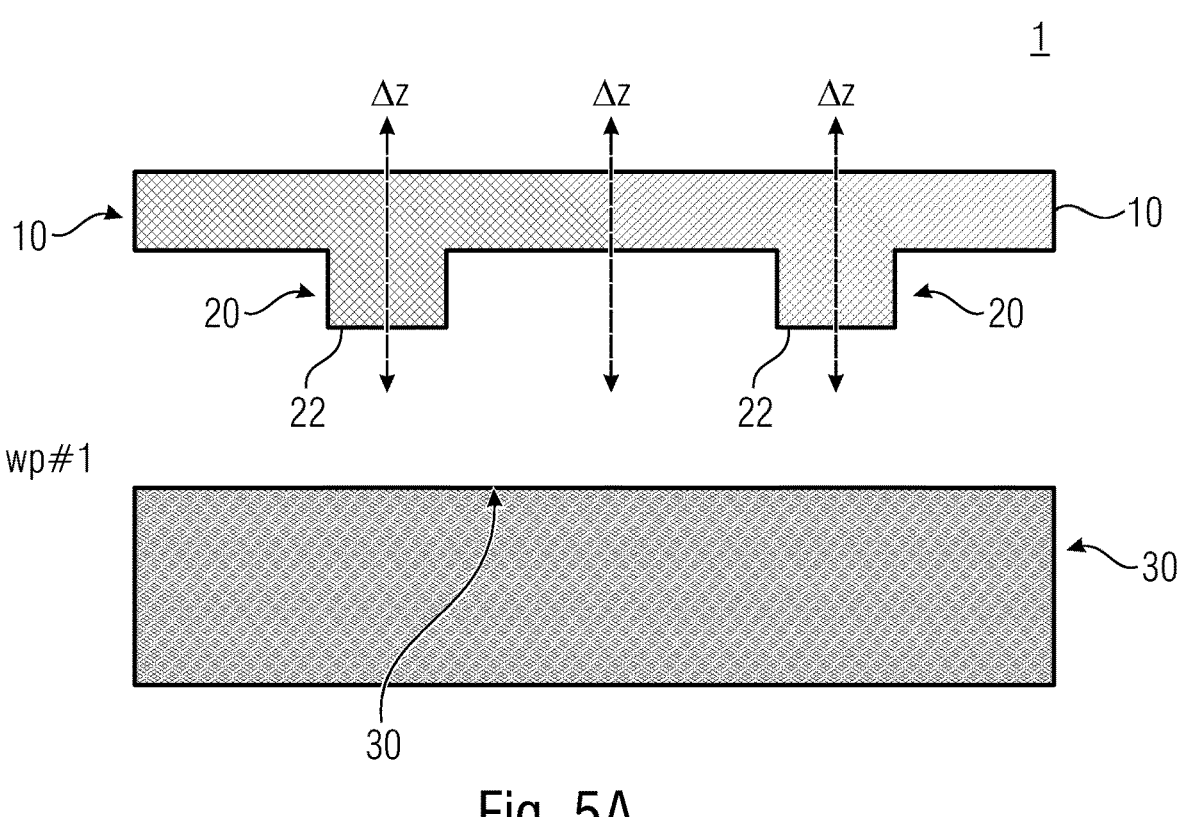
FIGS. 5A-5B show schematic cross-sectional views of a pressure sensing device according to a further embodiment in different operation conditions.
Figure 5B:
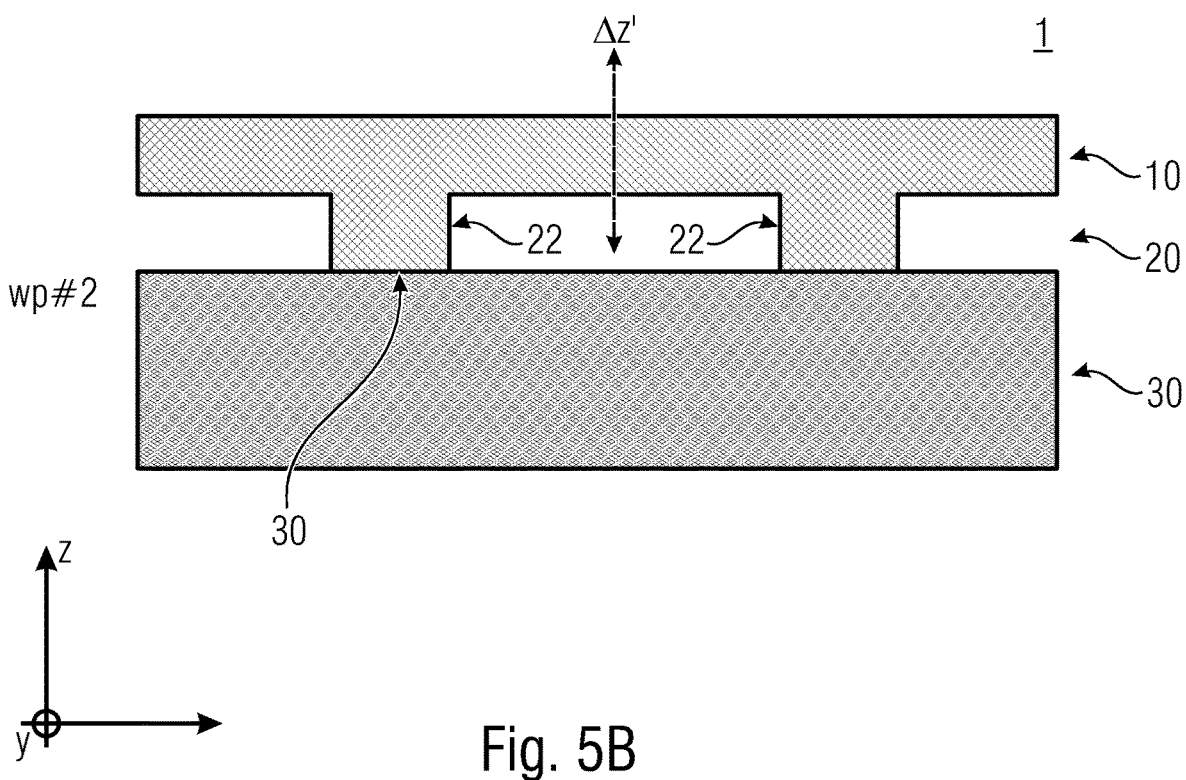

FIGS. 5A-5B show schematic cross-sectional views of a pressure sensing device 1 according to an embodiment in different operation or working conditions. FIG. 5A illustrates the pressure sensing device 1 in the first working point (range) #1 of two different working points #1 and #2. FIG. 5B illustrates the pressure sensing device 1 in the second working point (range) #2 of two different working points #1 and #2.

At the first working point #1 of FIG. 5A, the deflectable membrane structure 10 can move freely without achieving an abutting condition with the mechanical abutment structure 20. Once the deflectable membrane structure 10 comes into an abutting condition with the mechanical abutment structure 20, e.g. once the bumps 22 may contact to the counter structure (e.g., a substrate) 30 or any other rigid surface that limits its movement, the deflectable membrane structure 10 shows the different (second) working point #2 of FIG. 5B with a reduced compliance and, thus, a reduced sensitivity. Consequently, a switched characteristic can be achieved that changes the compliance and, thus, the sensitivity of the deflectable membrane structure 10.

As shown in FIGS. 5A-5B, the bumps 22 may be arranged at the membrane structure 10. Alternatively, the bumps 22 may be arranged at the counter structure 10. The following evaluations are equivalently applicable to this alternative implementation.

In FIG. 5A, the first, low(er) spring constant of the deflectable membrane 10 is assigned to a first, high(er)

sensitivity of the pressure sensing device 1. In FIG. 5B, the second, higher spring constant of the deflectable membrane 10 is assigned to a second, lower sensitivity of the pressure sensing device 1. The abutting condition (=clamping in z-direction) forms the switching point between the two sensitivity conditions of the deflectable membrane 10. Thus, the pressure sensor output shows two different sensitivity values at working point (range) #1 and working point (range) #2 with a switching at the abutting condition. The different working points #1 and #2 may be related to the atmospheric pressure range (#1) and the extended pressure range (#2), for example.

The deflection $\Delta z$, $\Delta z'$ of the deflectable membrane structure 10 in the different working points #1, #2 can then be detected and capacitively, piezo-electrically or piezo-resistively read-out, for example, in order to provide a corresponding (analog or AD-converted digital) output signal $S_{OUT}$ of the pressure sensing device 1.

FIGS. 6A-6C show schematic cross-sectional views of a pressure sensing device 1 according to an embodiment in different operation conditions. FIG. 6A illustrates the pressure sensing device 1 in the first working point (range) #1 of three different working points #1, #2 and #3. FIG. 6B illustrates the pressure sensing device 1 in the second working point (range) #2 of three different working points #1, #2 and #3. FIG. 6C illustrates the pressure sensing device 1 in the third working point (range) #3 of three different working points #1, #2 and #3.

As shown in FIGS. 6A-6C, the mechanical abutment structure 20 may be configured to provide the (first) abutting condition of the deflectable membrane structure 10 by means of the bump 22 together with the aligned counter-bump 24, when the deflection $\Delta z$ of the deflectable membrane structure 10 exceeds the deflection threshold, and wherein the mechanical abutment structure 20 is configured to provide a further abutting condition of the deflectable membrane structure 10, when the deflection $\Delta z$ of the deflectable membrane structure 10 exceeds a further deflection threshold and a remaining bump 22 (or further bumps 22) of the mechanical abutment structure 20 is (are) arranged between the deflectable membrane structure 10 and a counter structure 30 and is (are) arranged in mechanical contact with the deflectable membrane structure 10 and a counter structure 30. Thus, the further (second) abutting condition results in a change from the (increased) second spring constant to a further increased, third spring constant of the deflectable membrane structure 10.

As exemplarily shown in FIGS. 6A-6C, the bumps 22 are arranged at the membrane structure 10, wherein the counter-bump 24 are arranged at the counter structure 30. Alternatively, the bumps 22 may be arranged at the counter structure 30, wherein the counter-bump 24 may be arranged at the membrane structure 30. The following evaluations are equivalently applicable to this alternative implementation.

At the first working point #1 of FIG. 6A, the deflectable membrane structure 10 can move freely without achieving an abutting condition with the mechanical abutment structure 20.

Once the deflectable membrane structure 10 comes into the first abutting condition with the mechanical abutment structure 20, i.e. when the bump 22 contacts to the aligned counter-bump 24, the deflectable membrane structure 10 shows the second working point #2 of FIG. 6B with a reduced compliance and, thus, a reduced sensitivity.

Once the deflectable membrane structure 10 comes into the second abutting condition with the mechanical abutment structure 20, i.e. when the remaining bumps 22 abut to the counter structure (e.g., a substrate) 30 or any other rigid surface that limits its movement, the deflectable membrane structure 10 shows the third working point #3 of FIG. 6C with a further reduced compliance and, thus, a further reduced sensitivity. Consequently, a switched characteristic can be achieved that changes the compliance and, thus, the sensitivity of the deflectable membrane structure 10.

The first, low spring constant of the deflectable membrane 10 is assigned to a first, high sensitivity of the pressure sensing device 1, wherein the second, increased spring constant of the deflectable membrane 10 is assigned to a second, reduced sensitivity of the pressure sensing device 1, and wherein the third, further increased spring constant of the deflectable membrane 10 is assigned to a third, further reduced sensitivity of the pressure sensing device 1. The abutting conditions form the switching points between the three sensitivity conditions of the deflectable membrane 10. Thus, the pressure sensor output shows three different sensitivity values at working points #1, #2 and #3 with the respective switching at the abutting condition(s). The different working points #1, #2 and #3 may be related to different adjoining pressure ranges, such as a first pressure range (#1) and the extended, second and third pressure ranges (#2 and #3).

Consequently, a plurality of abutting conditions can be achieved with correspondingly set (and increased) spring constants of the deflectable membrane (diaphragm) structure 10 for providing a wide (extended) pressure range. The corresponding deflection state can be associated with a corresponding pressure range.

Thus, the pressure sensor output shows three different sensitivity values $S_1$, $S_2$, $S_3$ at working point (WP) #1, #2 and #3 with a respective switching at the first and second abutting condition. The deflection $\Delta z$ of the deflectable membrane structure 10 in the different working points #1, #2, #3 can then be detected and capacitively, piezo-electrically or piezo-resistively read-out, for example, in order to provide a corresponding (analog or AD-converted digital) output signal $S_{OUT}$ of the pressure sensing device 1.

FIGS. 7A-7C show schematic cross-sectional views of a pressure sensing device 1 according to an embodiment in different operation conditions. FIG. 7A illustrates the pressure sensing device 1 in the first working point (range) #1 of three different working points #1, #2 and #3. FIG. 7B illustrates the pressure sensing device 1 in the second working point (range) #2 of three different working points #1, #2 and #3. FIG. 7C illustrates the pressure sensing device 1 in the third working point (range) #3 of three different working points #1, #2 and #3.

As shown in FIGS. 7A-7C, the mechanical abutment structure 20 comprises a plurality of bumps 22, which are fixed to the deflectable membrane structure 10 (or alternatively to the counter structure 30) between the deflectable membrane structure 10 and the counter structure 30, wherein at least one of the bumps 22 comprises an increased (vertical) height when compared to the remaining bumps 22.

As exemplarily shown in FIGS. 7A-7C, the bumps 22 are arranged at the membrane structure 10. Alternatively, the bumps 22 (or some of the bumps) may be arranged at the counter structure 30. The following evaluations are equivalently applicable to this alternative implementation.

The technical effect of providing a bump 22 (of the plurality of bumps 22) with an increased (vertical) height when compared to the remaining bumps 22 corresponds to the provision of the bump 22 together with the aligned counter-bump 24 (as described above).

According to the embodiment, the mechanical abutment structure 20 may be configured to provide the (first) abutting condition of the deflectable membrane structure 10 by means of the bump 22 with the increased (vertical) height, when the deflection of the deflectable membrane structure 10 exceeds the deflection threshold and the bump 22 with the increased height is arranged between and in mechanical contact with the deflectable membrane structure 10 and the counter structure 30. The mechanical abutment structure 20 is configured to provide a further (second) abutting condition of the deflectable membrane structure 10, when the deflection $\Delta z$ of the deflectable membrane structure 10 exceeds a further deflection threshold and the remaining bump(s) of the mechanical abutment structure 20 is (are) arranged between the deflectable membrane structure 10 and a counter structure 30 and in mechanical contact with the deflectable membrane structure 10 and a counter structure 30, wherein the further abutting condition results in a change from the increased, second spring constant to a further increased, third spring constant of the deflectable membrane structure 10. Thus, the mechanical abutment structure 20 is configured to provide a further change from the second spring constant to an increased third spring constant of the deflectable membrane structure 10, when the deflection $\Delta z$ of the deflectable membrane structure 10 exceeds a further deflection threshold and the remaining bump(s) 22 of the abutment structure 20 is (are) arranged between and in mechanical contact with the deflectable membrane structure 10 and the counter structure 30.

At the first working point #1 of FIG. 7A, the deflectable membrane structure 10 can move freely without achieving an abutting condition with the mechanical abutment structure 20.

Once the deflectable membrane structure 10 comes into the first abutting condition with the mechanical abutment structure 20, i.e. when the bump 22 with the increased (vertical) height contacts (abuts) to the deflectable membrane structure 10, the deflectable membrane structure 10 shows the second working point #2 of FIG. 7B with a reduced compliance and, thus, a reduced sensitivity.

Once the deflectable membrane structure 10 comes into the second abutting condition with the mechanical abutment structure 20, i.e. when the remaining bumps 22 abut to the counter structure (e.g., a substrate) 30 or any other rigid surface that limits its movement, the deflectable membrane structure 10 shows the third working point #3 of FIG. 7C with a further reduced compliance and, thus, a further reduced sensitivity. Consequently, a switched characteristic can be achieved that changes the compliance and, thus, the sensitivity of the deflectable membrane structure 10.

The first, low spring constant of the deflectable membrane 10 is assigned to a first, high sensitivity $S_1$ of the pressure sensing device 1, wherein the second, increased spring constant of the deflectable membrane 10 is assigned to a second, reduced sensitivity $S_2$ of the pressure sensing device 1, and wherein the third, further increased spring constant of the deflectable membrane 10 is assigned to a third, further reduced sensitivity $S_3$ of the pressure sensing device 1. The abutting conditions form the switching points between the three sensitivity conditions of the deflectable membrane 10. Thus, the pressure sensor output shows three different sensitivity values at working points #1, #2 and #3 with the respective switching at the abutting condition(s). The different working points #1, #2 and #3 may be related to different adjoining pressure ranges, such as a first pressure range (#1) and the extended, second and third pressure ranges (#2 and #3).

Consequently, a plurality of abutting conditions can be achieved with correspondingly set (and increased) spring constants of the deflectable membrane (diaphragm) structure 10 for providing a wide (extended) pressure range. The corresponding deflection state can be associated with a corresponding pressure range.

Thus, the pressure sensor output shows three different sensitivity values $S_1$, $S_2$, $S_3$ at working point (WP) #1, #2 and #3 with a respective switching at the first and second abutting condition. The deflection $\Delta z$ of the deflectable membrane structure 10 in the different working points #1, #2, #3 can then be detected and capacitively, piezo-electrically or piezo-resistively read-out, for example, in order to provide a corresponding (analog or AD-converted digital) output signal $S_{OUT}$ of the pressure sensing device 1.

Figures 8A, 8B:
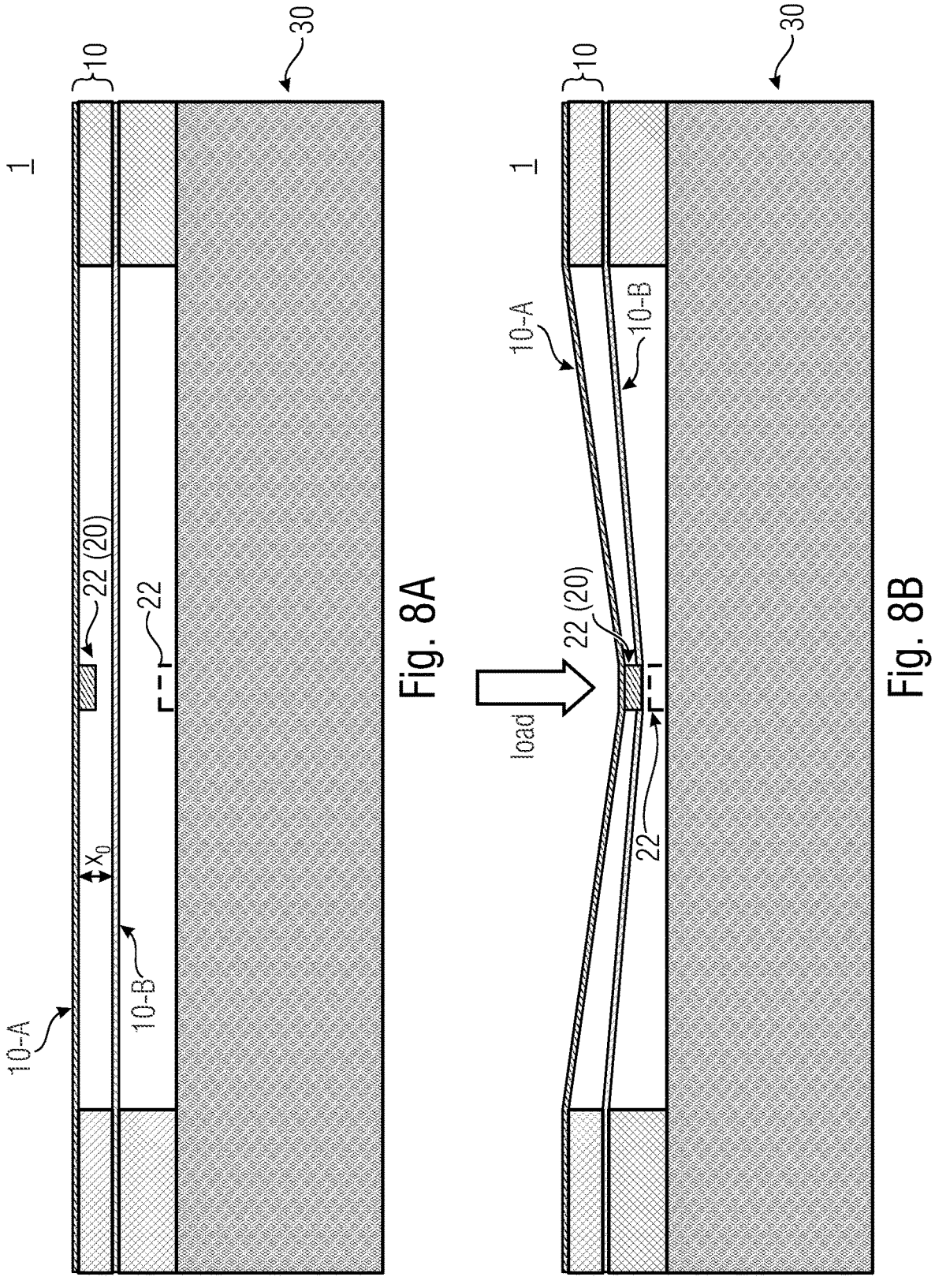
FIGS. 8A-8B show schematic cross-sectional views of a pressure sensing device according to a further embodiment in different operation conditions.

FIGS. 8A-8B show a schematic cross-sectional view of a pressure sensing device 1 according to a further embodiment in different operation conditions.

As shown in FIGS. 8A-8B, the deflectable membrane structure 10 comprises a first membrane element 10-A and a second, vertically spaced membrane element 10-B, wherein the mechanical abutment structure 20 (e.g., a bump 22) is fixed to the first and/or second membrane element 10-A, 10-B and is arranged between the first and second membrane element 10-A, 10-B. Thus, the deflectable membrane structure 10 may comprise a vertical stack of multiple membrane elements 10-A, 10-B, . . . .

As shown in FIGS. 8A-8B, the bump(s) 22 may be arranged at the first membrane element 10-A (between the first and second membrane element). Alternatively, the bump(s) 22 may be arranged at the second membrane element 10-B (between the first and second membrane element). The following evaluations are equivalently applicable to this alternative implementation.

The bump 22 may be arranged at the center point $X_0$ of the first or second deflectable membrane element 10-A, 10-B of the deflectable membrane structure 10 for permitting a maximum deflection of the deflectable membrane structure 10.

According to an embodiment, the thickness and/or geometry of the first and second deflectable membrane element 10-A, 10-B of the deflectable membrane structure 10 may be chosen for setting the intended different sensitivities at the different working points of the pressure sensing device 1. Thus, the first and second deflectable membrane element 10-A, 10-B of the deflectable membrane structure 10 may comprise the same thickness and/or geometry or may comprise the different thickness and/or geometry.

Moreover, the distance $X_0$ between the first and second deflectable membrane element 10-A, 10-B of the deflectable membrane structure 10 and/or the distance between the second deflectable membrane element 10-B of the deflectable membrane structure 10 and the counter structure 30 may be chosen for setting the intended different sensitivities at the different working points of the pressure sensing device 1.

At the first working point #1 of FIG. 8A, the first membrane element 10-A of the deflectable membrane structure 10 can move freely without achieving an abutting condition with (the mechanical abutment structure 20 and) the second membrane element 10-B of the deflectable membrane structure 10. Thus, the (first) spring constant of first membrane element 10-A of the deflectable membrane structure 10 is assigned to the first (high) sensitivity of the pressure sensing device 1.

Once the first membrane element 10-A of the deflectable membrane structure 10 comes into the first abutting condition with the second membrane element 10-B of the deflectable membrane structure 10, the deflectable membrane structure 10 shows the second working point #2 of FIG. 8B with a reduced compliance and, thus, a reduced sensitivity. In other words, the first membrane element 10-A (having the (first) spring constant) reaches with an increasing pressure load $P_{ext}$ an abutting condition (by means of the mechanical abutment structure 20) with the second membrane element 10-B, wherein the first membrane element 10-A of the deflectable membrane structure 10 abuts (is fixed) by means of the mechanical abutment element(s) 22 to the second membrane element 10-B of the deflectable membrane structure 10. Thus, the abutting condition of the first and second membrane element 10-A, 10-B results in an increased (second) spring constant of the deflectable membrane structure (with the abutted first and second membrane element resulting in a combined (=increased) second spring constant).

Optionally, the deflectable membrane structure 10 may come into a second abutting condition. Once the deflectable membrane structure 10 (having the abutted first and second membrane element 10-A and 10-B) comes into the second abutting condition with the counter structure 30, i.e. when the deflectable membrane structure 10 abut to the counter structure (e.g., a substrate) 30, to a further (optional) bump 22 at the counter structure 30 or any other rigid surface that limits its movement, the deflectable membrane structure 10 shows a third working point #3 with a further reduced compliance and, thus, a further reduced sensitivity. Consequently, a switched characteristic can be achieved that changes the compliance and, thus, the sensitivity of the deflectable membrane structure 10.

The threshold value for reaching the first and the optional second abutting condition can be set and identified by means of the dimensioning (e.g., size, shape, geometry, thickness, material(s) etc.) of the deflectable membrane elements 10-A and 10-B of the deflectable membrane structure 10. Thus, the intended different sensitivities of the pressure sensing device 1 at the different working points #1, #2, (optionally) #3 can be set and adjusted.

Thus, the pressure sensor output shows at least two different sensitivity values at working point #1, #2 and (optionally) #3 with a respective switching at the first and (optionally) second abutting condition. The deflection $\Delta z$ of the deflectable membrane structure 10 in the different working points #1, #2, (optionally) #3 can then be detected and capacitively, piezo-electrically or piezo-resistively read-out, for example, in order to provide a corresponding (analog or AD-converted digital) output signal $S_{OUT}$ of the pressure sensing device 1.

Figure 9A:
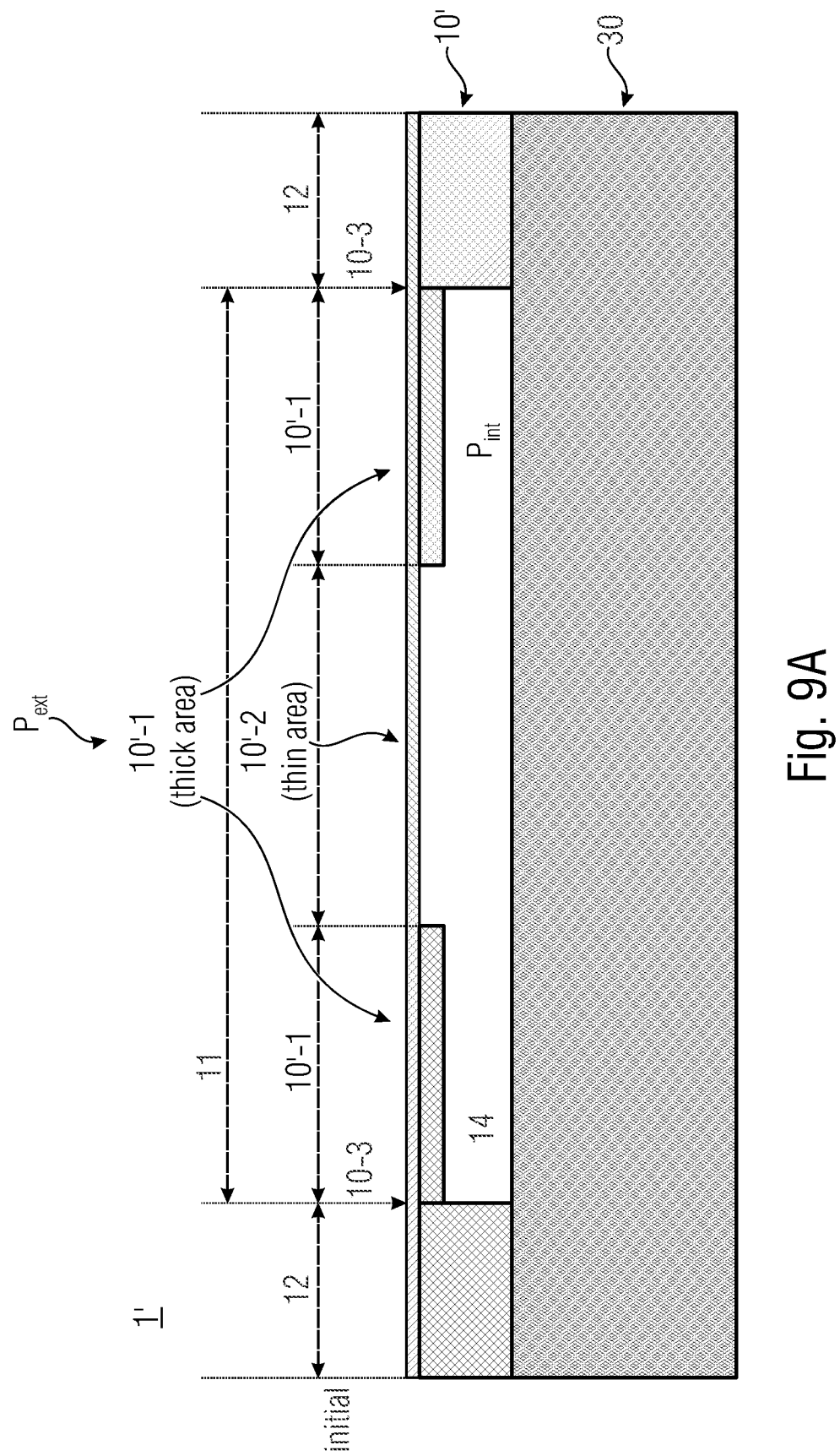
FIGS. 9A-9B show schematic cross-sectional views of a pressure sensing device according to a further embodiment in different operation conditions.
Figure 9B:
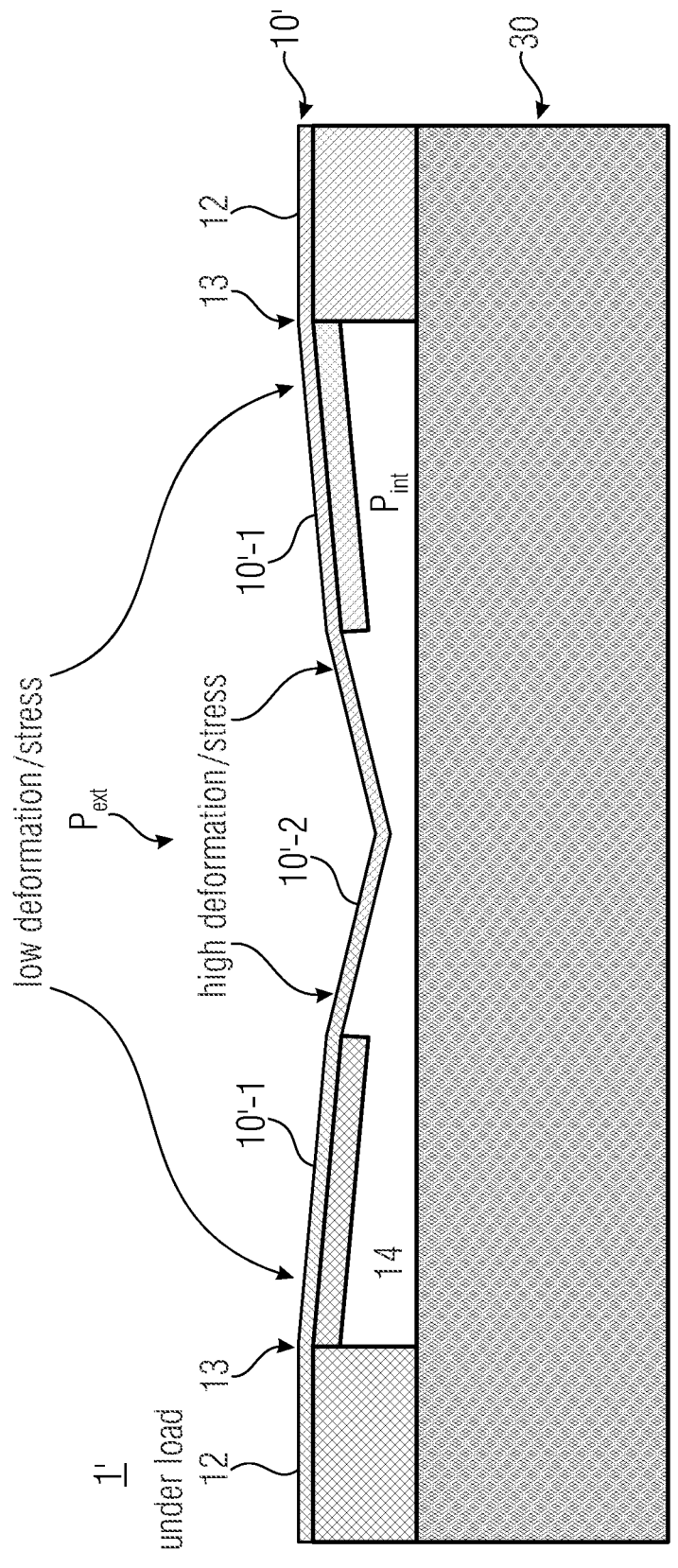

FIGS. 9A-9B show schematic cross-sectional views of a pressure sensing device 1' according to a further embodiment in different operation conditions. According to the embodiment as shown in FIGS. 9A-9B, the pressure sensing device 1' comprises a deflectable membrane structure 10' configured to provide a deflection-dependent output signal $S_{out}$ based on a pressure load $P_{ext}$, wherein the deflectable membrane structure 10' comprises a border region 10'-1 and a center region 10'-2, wherein the border region 10'-1 of the deflectable membrane structure 10' has a higher rigidity than a center region 10'-2 of the deflectable membrane structure 10' The center region 10'-2 of the deflectable membrane structure 10' is configured to provide a first spring constant of the deflectable membrane structure 10', wherein the border region 10'-1 of the deflectable membrane structure 10' is configured to provide a second increased spring constant of the deflectable membrane structure 10'.

Thus, the deflectable membrane structure 10' comprises the border region 10'-1 having a high(er) rigidity and a center region 10'-2 having a low(er) rigidity, so that the membrane structure 10' provides for different pressure ranges different rigidities (spring constants). The first, low(er) spring constant of center region 10'-2 of the deflectable membrane structure 10' is assigned to a first, higher sensitivity $S_1$ of the pressure sensing device 1, wherein the second, higher spring constant of the border region 10'-1 of the deflectable membrane structure 10' is assigned to a second, lower sensitivity $S_2$ of the pressure sensing device 1'. Thus, the pressure sensor output $S'_{out}$ shows two different sensitivity values at working point (range) #1 (see FIG. 9A) and working point (range) #2 (see FIG. 9B) with a continuous transition or switching between the working points #1 and #2. The different working points #1 and #2 may be related to the atmospheric pressure range (#1) and the extended pressure range (#2), for example.

As shown in FIGS. 9A-9B, the border region is thicker than the center region 10'-2. Assuming the same or a similar material or material combination of the layer or layer stack of the border region 10'-1 and the center region 10'-2, the center region 10'-2 has a lower rigidity than the border region 10'1. The local thickness variation of the border region 10'-1 and the center region 10'-2 provides two deformation zones with different rigidities und, thus, different sensitivities $S_1$, $S_2$.

The deflectable membrane structure 10' may be arranged to close a cavity 14 and is exposed to the environmental atmosphere in form of the external pressure load $P_{ext}$. The deflectable membrane structure 10' may comprise the deflectable portion 11 (the border region 10'-1 and the center region 10'-2) and an anchored region 12, wherein anchored region 12 is mechanically coupled or anchored to a support (anchor) or carrier structure (e.g., a substrate) 30. The deflectable portion 11 has the border line 10-3. The deflectable membrane structure 10' of the pressure sensing device 1' may be arranged to provide a hermetically closed configuration with the cavity 14 having a reduced low atmospheric pressure (e.g., vacuum or near vacuum) $P_{int}$ with an atmospheric pressure of about or below 3 mbar or 1 mbar.

According to an embodiment as shown in FIG. 9A-B, the different spring constants of the deflectable membrane structure 10' define different working points (working ranges) of the deflectable membrane structure 10', which are associated with different pressure load ranges.

Thus, the different spring constants of the deflectable membrane structure 10' are associated to different sensitivity ranges of the deflectable membrane structure 10'. For example, the deflectable membrane structure 10' responds or reacts differently depending on the incident or applied pressure load $P_{ext}$.

The first, low spring constant of the deflectable membrane 10' is assigned to a first, high sensitivity $S_1$ of the pressure sensing device 1', wherein the second, increased spring constant of the deflectable membrane 10' is assigned to a second, reduced sensitivity $S_2$ of the pressure sensing device 1', etc. The abutting condition(s) forms the switching point(s) between the different sensitivity conditions of the deflectable membrane 10'. Thus, the pressure sensor output shows a plurality of different sensitivity values at working points #1, #2 and #3 with the respective switching at the abutting condition(s).

According to an embodiment, the pressure sensing device 1' may comprises a read-out circuitry (or ASIC) 40 for capacitively, piezo-resistively and/or piezo-electrically reading out the deflection dependent output signal $S_{out}$.

Thus, the pressure sensing device 1' may provide the output signal $S_{out}$, wherein the pressure load dependent deflection $\Delta z$ of the deflectable membrane structure 10' of the pressure sensing device 1' may result a capacitance change, a piezo-resistance change and/or a piezoelectrically effected electrical charge.

Here, the above evaluations in FIGS. 1A-1B with respect to the different read-out implementation of the pressure sensing device 1 are equivalently applicable to the pressure sensing device 1' of FIGS. 9A-9B.

According to an embodiment, the deflectable membrane structure 10' of the pressure sensor device 1' may comprise piezo-resistive read out circuit, wherein a first portion of the piezo-resistive read out circuit is arranged at the border region 10'-1 having a high(er) rigidity and a first portion of the piezo-resistive read out circuit is arranged at the center region 10'-2 having a low(er) rigidity. The local thickness variation of the border region 10'-1 and the center region 10'-2 provides two deformation zones with different rigidities und, thus, different sensitivities. Placing the different portions of the piezo-resistive read out circuit in the different deformation zones provides for two independent output signals with a high sensitivity (=High deformation) at the center region 10'-2 having a low(er) rigidity and with low sensitivity (=Low deformation) at the border region 10'-1 having a high(er) rigidity.

The described aspects provide an efficient measuring of the first pressure range and the second pressure range on a single sensor system. In other words, the measurement of multiple pressure ranges with different sensitivities or resolutions on a single sensor system (MEMS+ASIC) is provided.

Embodiments of the pressure sensor device 1, 1' may provide a consumer pressure sensor especially in SmartPhone and SmartWatch products, which can work in water and measure the water pressure and water depth therefore.

Embodiments of the pressure sensor device 1, 1' may allow remain the assembly flow the same, wherein a calibration flow of the final system may be adapted for identifying the pressure point where switching occurs and sensitivity parameters for different working points. In a further scenario, embodiments of the pressure sensor device 1, 1' (the MEMS die with the membrane) may be combined with an adapted ASIC extending the available feature range. Consequently, customers may be provided with more options in assembly, calibration and system level testing.

Additional embodiments and aspects are described which may be used alone or in combination with the features and functionalities described herein.

According to an embodiment, a pressure sensing device comprises a deflectable membrane structure configured to provide a deflection dependent output signal $S_{out}$ based on a pressure load, and a mechanical abutment structure for adjusting a spring constant of the deflectable membrane structure depending on the deflection of the deflectable membrane structure, wherein the mechanical abutment structure is configured to provide an abutting condition of the deflectable membrane structure, when the deflection of the deflectable membrane structure exceeds a deflection threshold, wherein the abutting condition results in a change from the first spring constant to an increased, second spring constant of the deflectable membrane structure.

According to an embodiment, the pressure sensing device comprises a counter structure, which vertically opposes the deflectable membrane structure, wherein the mechanical abutment structure is formed as a bump or a plurality of bumps between the deflectable membrane structure and the counter structure.

According to an embodiment, the mechanical abutment structure is mechanically fixed either to the deflectable membrane structure or the counter structure.

According to an embodiment, the deflectable membrane structure and the counter structure are configured to abut to the mechanical abutment structure from opposing sides, when the deflection of the deflectable membrane structure exceeds the deflection threshold, so that the mechanical abutment structure is arranged between and in mechanical contact with the deflectable membrane structure and the counter structure.

According to an embodiment, the mechanical abutment structure comprises a plurality of bumps, which are fixed to the deflectable membrane structure between the deflectable membrane structure and the counter structure, and wherein the mechanical abutment structure further comprises a counter bump, which is fixed to the counter structure between the deflectable membrane structure and the counter structure, and which is aligned with one of the membrane bumps.

According to an embodiment, the mechanical abutment structure is configured to provide the abutting condition of the deflectable membrane structure by means of the bump together with the aligned counter bump, when the deflection of the deflectable membrane structure exceeds the deflection threshold, and wherein the mechanical abutment structure is configured to provide a further abutting condition of the deflectable membrane structure, when the deflection of the deflectable membrane structure exceeds a further deflection threshold and a remaining bump of the mechanical abutment structure is arranged between and in mechanical contact with the deflectable membrane structure and the counter structure, wherein the further abutting condition results in a change from the second spring constant to an increased, third spring constant of the deflectable membrane structure.

According to an embodiment the mechanical abutment structure comprises a plurality of bumps, which are fixed to the counter structure between the deflectable membrane structure and the counter structure, and wherein the mechanical abutment structure further comprises a further bump, which is fixed to the counter structure between the deflectable membrane structure and the counter structure, and which is aligned with one of the bumps.

According to an embodiment, the mechanical abutment structure is configured to provide the abutting condition of the deflectable membrane structure by means of the bump together with the aligned further bump, when the deflection of the deflectable membrane structure exceeds the deflection threshold, and wherein the mechanical abutment structure is configured to provide a further abutting condition of the deflectable membrane structure, when the deflection of the deflectable membrane structure exceeds a further deflection threshold and the remaining bump of the mechanical abutment structure is arranged between and in mechanical contact with the deflectable membrane structure and the counter structure, wherein the further abutting condition results in a change from the second spring constant to an increased, third spring constant of the deflectable membrane structure.

According to an embodiment, the mechanical abutment structure comprises a plurality of bumps, which are fixed to the deflectable membrane structure or to the counter structure between the deflectable membrane structure and the counter structure, wherein at least one of the bumps comprises an increased height when compared to the remaining bumps.

According to an embodiment, the mechanical abutment structure is configured to provide the abutting condition of the deflectable membrane structure by means of the bump with the increased height, when the deflection of the deflectable membrane structure exceeds the deflection threshold and the bump with the increased height is arranged between and in mechanical contact with the deflectable membrane structure and the counter structure, and wherein the mechanical abutment structure is configured to provide a further change from the second spring constant to an increased, third spring constant of the deflectable membrane structure, when the deflection of the deflectable membrane structure exceeds a further deflection threshold and the remaining bump of the mechanical abutment structure is arranged between and in mechanical contact with the deflectable membrane structure and the counter structure.

According to an embodiment, the deflectable membrane structure comprises a first membrane element and a second vertically spaced membrane element, wherein the mechanical abutment structure is fixed to either the first or second membrane element and is arranged between the first and second membrane element.

According to an embodiment, the mechanical abutment structure is arranged between and in mechanical contact with the first and second element of the deflectable membrane structure and provides the abutting condition of the deflectable membrane structure, when the deflection of the deflectable membrane structure exceeds the deflection threshold, wherein the abutting condition results in the change from the first spring constant to the increased, second spring constant of the deflectable membrane structure.

According to an embodiment, the bump of the mechanical abutment structure comprises an anti-sticking surface measure.

According to an embodiment, a pressure sensing device comprises a deflectable membrane structure configured to provide a deflection dependent output signal $S_{out}$ based on a pressure load, wherein the deflectable membrane structure comprises a border region and a center region, wherein the border region of the deflectable membrane structure has a higher rigidity than a center region of the deflectable membrane structure, wherein the center region of the deflectable membrane structure is configured to provide a first spring constant of the deflectable membrane structure, and wherein the border region of the deflectable membrane structure is configured to provide a second, increased spring constant of the deflectable membrane structure.

According to an embodiment, the different spring constants of the deflectable membrane structure define different working ranges of the deflectable membrane structure which are associated to different load ranges.

According to an embodiment, the different spring constants of the deflectable membrane structure are associated to different sensitivity ranges of the deflectable membrane structure.

According to an embodiment, the pressure sensing device further comprises a read-out circuitry for capacitively, piezo-resistively and/or piezo-electrically read out the deflection dependent output signal.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Depending on certain implementation requirements, embodiments of the control circuitry can be implemented in hardware or in software or at least partially in hardware or at least partially in software. Generally, embodiments of the control circuitry can be implemented as a computer program product with a program code, the program code being operative for performing one of the methods when the computer program product runs on a computer. The program code may for example be stored on a machine readable carrier.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. A pressure sensing device comprising:
a deflectable membrane structure configured to provide a deflection dependent output signal based on a pressure load;
a mechanical abutment structure for adjusting a spring constant of the deflectable membrane structure depending on the deflection of the deflectable membrane structure; and
a counter structure arranged vertically opposite to the deflectable membrane structure,
wherein the mechanical abutment structure comprises a plurality of bumps, which are fixed to the deflectable membrane structure between the deflectable membrane structure and the counter structure,
wherein the mechanical abutment structure further comprises a counter bump, which is fixed to the counter structure between the deflectable membrane structure and the counter structure, and which is aligned with a bump of the plurality of bumps to form an aligned counter bump,
wherein the mechanical abutment structure is configured to provide a first abutting condition of the deflectable membrane structure via the aligned counter bump, when the deflection of the deflectable membrane structure exceeds a first deflection threshold,
wherein the first abutting condition results in a change from a first spring constant to an increased, second spring constant of the deflectable membrane structure,
wherein the mechanical abutment structure is configured to provide a second abutting condition of the deflectable membrane structure, when the deflection of the deflectable membrane structure exceeds a second deflection threshold and a remaining bump of the mechanical abutment structure is arranged between and in mechanical contact with the deflectable membrane structure and the counter structure, and
wherein the second abutting condition results in a change from the second spring constant to an increased, third spring constant of the deflectable membrane structure.

2. The pressure sensing device according to claim 1, wherein the deflectable membrane structure and the counter structure are configured to abut to the mechanical abutment structure from opposing sides.

3. The pressure sensing device according to claim 1, wherein at least one of the bumps of the plurality of bumps comprises an increased height when compared to other bumps of the plurality of bumps.

4. The pressure sensing device according to claim 1, wherein the deflectable membrane structure comprises a first membrane element and a second vertically spaced membrane element, wherein the mechanical abutment structure is fixed to either the first or second membrane element.

5. The pressure sensing device according to claim 1, wherein the bump of the mechanical abutment structure comprises an anti-sticking surface.

6. The pressure sensing device according to claim 5, wherein the anti-sticking surface comprises a thin film.

7. The pressure sensing device according to claim 5, wherein the anti-sticking surface comprises a plurality of thin films.

8. The pressure sensing device according to claim 1, wherein the remaining bump comprises a several bumps.

9. The pressure sensing device according to claim 1, wherein the plurality of bumps comprises the remaining bump.

10. The pressure sensing device according to claim 1, wherein the remaining bump is fixed to the counter structure.

11. The pressure sensing device according to claim 10, wherein the remaining bump comprises several bumps.

12. The pressure sensing device according to claim 1, wherein the bump is arranged in a center of the deflectable membrane structure.

13. The pressure sensing device according to claim 12, wherein further bumps of the plurality of bumps are aligned with a contour line of the deflectable membrane structure.

14. A pressure sensing device comprising:
a deflectable membrane structure configured to provide a deflection dependent output signal based on a pressure load; and
a mechanical abutment structure for adjusting a spring constant of the deflectable membrane structure depending on the deflection of the deflectable membrane structure,
wherein the mechanical abutment structure comprises a plurality of bumps, which are fixed to the deflectable membrane structure, the deflectable membrane structure facing a counter structure,
wherein the mechanical abutment structure further comprises a counter bump, which is fixable to the counter structure, and which is aligned with a bump of the plurality of bumps to form an aligned counter bump, wherein the mechanical abutment structure is configured to provide a first abutting condition of the deflectable membrane structure via the aligned counter bump, when the deflection of the deflectable membrane structure exceeds a first deflection threshold, wherein the first abutting condition results in a change from a first spring constant to an increased, second spring constant of the deflectable membrane structure, wherein the mechanical abutment structure is configured to provide a second abutting condition of the deflectable membrane structure, when the deflection of the deflectable membrane structure exceeds a second deflection threshold and a remaining bump of the plurality of bumps contacts the counter structure, and wherein the second abutting condition results in a change from the second spring constant to an increased, third spring constant of the deflectable membrane structure.

15. The pressure sensing device according to claim 14, wherein the bump of the mechanical abutment structure comprises an anti-sticking surface.

16. The pressure sensing device according to claim 15, wherein the anti-sticking surface comprises a thin film or a plurality of thin films.

17. The pressure sensing device according to claim 14, wherein the remaining bump comprises a several bumps.

18. The pressure sensing device according to claim 14, wherein the bump is arranged in a center of the deflectable membrane structure.

19. The pressure sensing device according to claim 18, wherein further bumps of the plurality of bumps are aligned with a contour line of the deflectable membrane structure.

20. The pressure sensing device according to claim 14, wherein the bump has an increased height relative to the remaining bump.

* * * * *